US011599757B1

(12) United States Patent
Daugherty et al.

(10) Patent No.: US 11,599,757 B1
(45) Date of Patent: Mar. 7, 2023

(54) COLLECTIBLE MACHINE-READABLE CODES

(71) Applicant: the dtx company, New York, NY (US)

(72) Inventors: Corey Benjamin Daugherty, Barrington, RI (US); Patrik Andrew Devlin, New York, NY (US); Timothy Armstrong, Greenwich, CT (US)

(73) Assignee: the dtx company, New York, NY (US)

( * ) Notice: Subject to any disclaimer, the term of this patent is extended or adjusted under 35 U.S.C. 154(b) by 58 days.

(21) Appl. No.: 17/410,200

(22) Filed: Aug. 24, 2021

(51) Int. Cl.
*G06K 19/06* (2006.01)
*G06K 7/14* (2006.01)

(52) U.S. Cl.
CPC ..... *G06K 19/06037* (2013.01); *G06K 7/1417* (2013.01)

(58) Field of Classification Search
CPC .............. G06K 19/06037; G06K 7/1417
USPC ............................................ 235/462.1, 494
See application file for complete search history.

(56) References Cited

U.S. PATENT DOCUMENTS

| | | | |
|---|---|---|---|
| 7,467,356 B2 | 12/2008 | Gettman et al. | |
| 7,504,949 B1 | 3/2009 | Rouaix et al. | |
| D697,529 S | 1/2014 | Judge Cornish | |
| D702,723 S | 4/2014 | Abratowski et al. | |
| D723,104 S | 2/2015 | Cho et al. | |
| D769,296 S | 10/2016 | Grecia | |
| 9,704,081 B2 | 7/2017 | Tanaka et al. | |
| 9,936,249 B1 | 4/2018 | Nelson et al. | |
| D826,955 S | 8/2018 | Grecia | |
| D857,054 S | 8/2019 | Grecia | |
| 10,375,060 B1 | 8/2019 | Graves et al. | |
| D860,256 S | 9/2019 | Stephen | |
| 10,460,138 B2 | 10/2019 | Barnum | |
| 10,803,432 B1 | 10/2020 | Miles | |
| D905,743 S | 12/2020 | Jewitt | |
| 10,963,868 B1 | 3/2021 | McCauley et al. | |
| D918,936 S | 5/2021 | Walsh et al. | |
| 11,010,650 B1 | 5/2021 | Devlin et al. | |
| 11,120,095 B2 | 9/2021 | Askarian et al. | |
| D936,699 S | 11/2021 | McDonald | |

(Continued)

OTHER PUBLICATIONS

Inderscience Enterprises Ltd., Wickramasinghe et al., "A Mathematical Model for Computational Aesthetics," pp. 310-324, 2010, Int. J. Computational Vision and Robotics, vol. 1, No. 3.
Elsevier, Maity et al., "A Computational Model to Predict Aesthetic Quality of Text Elements of GUI," pp. 152-159, 2016, Procedia Computer Science 84 (2016), www.sciencedirect.com.

(Continued)

*Primary Examiner* — Paultep Savusdiphol
(74) *Attorney, Agent, or Firm* — Weiss & Arons LLP

(57) ABSTRACT

This disclosure relates to technology that provides dynamically configurable access to customized digital content associated with a machine-readable label ("MRL"). A MRL may be designed, printed and distributed to viewers. After distribution, the MRL may be collected by an owner who activates the collectible MRL and associates the MRL with customized content. At a time they are generated, a collectible MRL may be associated with a default scan destination. The default scan destination may be encoded in a data zone of the collectible MRL. The information encoded in a data zone of the collectible MRL may not be changeable after the MRL is distributed or fixed in tangible form. The disclosed technology provides apparatus and methods for customizing content associated with a MRL even after the MRL has been fixed in tangible form.

20 Claims, 20 Drawing Sheets

(56) References Cited

U.S. PATENT DOCUMENTS

| | | | |
|---|---|---|---|
| 11,194,981 | B2 | 12/2021 | Filter et al. |
| 11,205,105 | B1 | 12/2021 | Devlin et al. |
| 11,334,779 | B1 | 5/2022 | Schwarzberg |
| 11,379,820 | B2 | 7/2022 | Mossoba et al. |
| 2002/0032791 | A1 | 3/2002 | Isherwood et al. |
| 2002/0139839 | A1 | 10/2002 | Catan |
| 2004/0123223 | A1 | 6/2004 | Halford |
| 2004/0246529 | A1 | 12/2004 | Pruden et al. |
| 2006/0196950 | A1 | 9/2006 | Kiliccote |
| 2006/0215931 | A1 | 9/2006 | Shimomukai |
| 2007/0035327 | A1 | 2/2007 | Baeckler et al. |
| 2007/0286455 | A1 | 12/2007 | Bradley |
| 2009/0094175 | A1 | 4/2009 | Provos et al. |
| 2009/0240816 | A1 | 9/2009 | Philyaw et al. |
| 2010/0128921 | A1 | 5/2010 | Alattar et al. |
| 2011/0290882 | A1 | 12/2011 | Gu et al. |
| 2012/0016678 | A1 | 1/2012 | Gruber et al. |
| 2012/0206648 | A1 | 8/2012 | Casagrande et al. |
| 2012/0256732 | A1 | 10/2012 | McAllister |
| 2012/0278465 | A1 | 11/2012 | Johnson |
| 2013/0112760 | A1 | 5/2013 | Schory et al. |
| 2013/0197992 | A1 | 8/2013 | Bao |
| 2013/0215475 | A1 | 8/2013 | Noguchi |
| 2013/0228624 | A1 | 9/2013 | Byrd et al. |
| 2013/0297430 | A1 | 11/2013 | Soergel |
| 2014/0001253 | A1 | 1/2014 | Smith |
| 2014/0095461 | A1 | 4/2014 | Burt |
| 2015/0006702 | A1 | 1/2015 | Lakes et al. |
| 2015/0014417 | A1 | 1/2015 | Finlow-Bates et al. |
| 2015/0048169 | A1 | 2/2015 | Doberschutz |
| 2015/0099946 | A1 | 4/2015 | Sahin |
| 2015/0324678 | A1 | 11/2015 | Simske et al. |
| 2016/0063129 | A1 | 3/2016 | Lim et al. |
| 2016/0148083 | A1 | 5/2016 | Osborne et al. |
| 2016/0162767 | A1 | 6/2016 | Ito et al. |
| 2016/0189016 | A1 | 6/2016 | Windmueller et al. |
| 2016/0247423 | A1 | 8/2016 | Hohl et al. |
| 2016/0364825 | A1 | 12/2016 | Pan |
| 2017/0264608 | A1 | 9/2017 | Moore et al. |
| 2017/0300854 | A1 | 10/2017 | Harcar et al. |
| 2018/0365330 | A1 | 12/2018 | Lin et al. |
| 2019/0089757 | A1 | 3/2019 | Sorensen et al. |
| 2019/0138721 | A1 | 5/2019 | Wojnowicz et al. |
| 2019/0221293 | A1 | 7/2019 | Zhang |
| 2019/0234957 | A1 | 8/2019 | Pothini et al. |
| 2019/0258814 | A1 | 8/2019 | Heeter |
| 2019/0281030 | A1 | 9/2019 | Isaacson et al. |
| 2019/0281124 | A1 | 9/2019 | Lim et al. |
| 2020/0356080 | A1 | 11/2020 | Principato |
| 2020/0356083 | A1 | 11/2020 | Principato |
| 2020/0356741 | A1 | 11/2020 | Principato |
| 2020/0394699 | A1* | 12/2020 | Mueller .................. G06T 17/00 |
| 2021/0042730 | A1 | 2/2021 | Lee |
| 2021/0271803 | A1* | 9/2021 | Seymour ............. G06F 15/0291 |
| 2021/0287202 | A1* | 9/2021 | Fowler ............... G06Q 20/3278 |
| 2021/0334490 | A1 | 10/2021 | Luk et al. |
| 2021/0357715 | A1 | 11/2021 | Schimke et al. |
| 2022/0253811 | A1* | 8/2022 | Fowler ............... G06K 7/10366 |
| 2022/0374664 | A1 | 11/2022 | Zhou et al. |

OTHER PUBLICATIONS

AI Shack, Utkarsh Sinha, "Scanning QR Codes," 2010, https://aishack.in/tutorials/scanning-qr-codes-1/.

AIA Vision Online, "The Most Common Causes of Unreadable Barcodes," Apr. 15, 2015, https://www.visiononline.org/vision-resources-details.cfm?content_id=5404.

Workwithcolor.Com, "Color Properties/Terminology," Retrieved on Jun. 8, 2020, http://www.workwithcolor.com/color-properties-definitions-0101.htm.

The Eurographics Association, Florian Hoenig, "Defining Computational Aesthetics," 2005, Computational Aesthetics in Graphics, Visualization and Imaging (2005), www.diglib.eg.org.

DataGenetics, "Wounded QR Codes," Nov. 2013, http://datagenetics.com/bioe/november12013/index.html.

QR Code Monkey, "6 Reasons Why Your QR Code Is Not Working," Retrieved on Jun. 9, 2020, https://www.qrcode-monkey.com/6-reasons-why-your-qr-code-is-not-working.

Techspot, Inc., Mark Turner, "QR Codes Explained," Sep. 3, 2018, https://www.techspot.com/guides/1676-qr-code-explained/.

Medium.com, Sciforce, "Computational Aesthetics: Shall We Let Computers Measure Beauty?," Jun. 12, 2020, https://medium.com/sciforce/computational-aesthetics-shall-we-let-computers-measure-beauty-db2205989fb.

Thonky.com, "Module Placement in Matrix," Retrieved on Jun. 8, 2020, https://www.thonky.com/qr-code-tutorial/module-placement-matrix.

Keyence Corporation of America, "What is a QR Code," Retrieved on Jun. 8, 2020, https://www.keyence.com/ss/products/auto_id/barcode_lecture/basic_2d/qr/.

Wikimedia Foundation, Inc., "QR Code," Retrieved on Jun. 3, 2020, https://en.wikipedia.org/wiki/QR_code.

Wikimedia Foundation, Inc., Walter Tuveli, "QR Code—Structure," 2012, https://en.wikipedia.org/wiki/QR_code#/media/File:QRCode-2-Structure.png.

Wikimedia Foundation, Inc., "ShotCode," Retrieved on Aug. 6, 2021, https://en.wikipedia.org/wiki/ShotCode#searchInput.

Medium.com, Punit Pathak, "ETL-Understanding It and Effectively Using It," Jan. 7, 2019, https://medium.com/hashmapinc/etl-understanding-it-and-effectively-using-it-f827a5b3e54d.

Strathmore University (Nairobi, Kenya), Kizi Dimira Othuon, "Improving Customer Experience Using an Android Barcode Reader Application," Apr. 2018, https://su-plus.strathmore.edu/bitstream/handle/11071/5978/Improving%20customer%20shopping%20experience%20using%20an%20Android%20barcode%20reader%20application.pdf?sequence=1&isAllowed=y.

Westboroughtv.org, Horrigan, Aidan, "Mr. WHS 2020," Jun. 12, 2020, https://westboroughtv.org/mr-whs-2020-2/.

Facebook.com, Wa, Izakaya, "QR codes for the dinner menu and lunch menu at Memorial!" Jul. 24, 2020, https://m.facebook.com/196433773873837/posts/qr-codes-for-the-dinner-menu-and-lunch-menu-at-memorial, 1730306280486571.

Ispot.tv, "StockX TV Spot, 'Flowcode: Never Sold Out,'" Mar. 27, 2020, https://www.ispot.tv/ad/nVly/stockx-flowcode-never-sold-out.

Nyp.org, "#FitForTheFrontline Challenge Unites Nation's Top Medical Centers to Support Frontline Healthcare Workers," May 28, 2020, https://www.nyp.org/news/fit-for-the-frontline-challenge.

\* cited by examiner

| Time | Unique MRL Identifier | Custom Scan Location 1 | Owner | Active Time Window | Custom Scan Location 2 |
|---|---|---|---|---|---|
| 1 | 301 | www.flow.page/JohnDoe | John Doe | M-Th, 9am-5pm | collectible |
| 1 | 301 | www.flow.page/Station313Cafe/Drinks_Menu | Station 313 Cafe | Su-S, 6pm-8am | www.flow.page/Station 313Cafe |
| 1 | 303 | collectible | Null | M-Th, 9am-5pm | collectible |
| 1 | 303 | www.flow.page/abc | ABC Corp. | Su, 8am-7pm | collectible |
| 1 | 307 | www.flow.page/JohnDoe | John Doe | All | collectible |
| 1 | 509 | www.flow.page/JohnDoe | John Doe | When train 309 is in station 505 | collectible |
| 1 | 509 | www.Station313Cafe.com/[MEAL TIME]Menu | Station 313 Cafe | When train 309 is NOT in station 505 | www.flow.page/Station 313Cafe |

FIG. 7B

COLLECTIBLE MACHINE-READABLE CODES

FIELD OF TECHNOLOGY

This disclosure relates to dynamically configuring customized content linked to a machine-readable label ("MRL").

BACKGROUND

MRLs, such as quick-response ("QR") codes, provide businesses with a fast and efficient medium for connecting with consumers. Instructions, such as URLs, contact information and other alphanumeric information may be encoded in an MRL. Businesses may leverage a MRL to guide consumers to a desired destination (real or virtual) where the customers can access products, services and information provided by the business. However, a scanning device is needed to scan and interpret the instructions encoded in an MRL.

In 2010, 62.6 million people in the United States used smartphones. In 2020 that number is predicted to more than quadruple to 272.6 million. Commensurate with increased smartphone use is integration of technology into smartphones that scans and interprets an MRL. Today, many smartphones include a native camera application that recognizes MRLs such as QR codes. There is no need to download and install a separate application or use a separate reader to scan an MRL.

MRLs potentially offer an inexpensive means of providing consumers with easy access to products, services or information. Consumers are already using their smartphones to search for information about a product/service of interest. Now, businesses can tap into this tendency by using MRLs to guide consumers to targeted content associated with a product/service. Furthermore, MRLs are inexpensive and easy to print on a variety of surfaces such as business cards, product packaging, posters or marketing materials.

Despite the proliferation of mobile devices, widespread adoption of MRLs still faces a significant hurdle. Deployment of a MRL is a cumbersome, multi-step process. A customer must create navigate to an online location (e.g., website) that provides access to a MRL generator. The customer utilizes the generator to design an aesthetic appearance of an MRL. The design process may include inputting a destination location or other information that will be encoded into the MRL.

The customer must then take steps to present the generated MRL to the public. These steps may include ordering tangible copies of the generated MRL, waiting for the ordered copies to arrive and then affixing the ordered copies to a surface. These multiple steps present an obstacle to seamless, mass deployment of MRLs.

Another hurdle facing widespread adoption of MRLs is that conventionally, instructions encoded in a MRL may be static and not easily changed. MRLs may be printed and affixed to real property or other tangible surfaces. For example, a MRL may be positioned at a fixed location or on a specific object (e.g., a bicycle, hat, shirt, car). Contact information or a URL associated with a business may change. Yet, a MRL affixed to a tangible surface may still encode old contact information or an old URL. It is costly to remove an old MRL and replace it with an updated MRL.

It would be desirable to provide apparatus and methods for deploying MRLs on offline surfaces and then allowing the MRLs to be collected and configured on-demand by a customer. It would be desirable to provide apparatus and methods for MRLs that may be printed and distributed, without any knowledge of content that may be linked to the MRL or intended owner of the MRL. It would be desirable to provide apparatus and methods for distributing static MRLs such as QR codes that are dynamically configurable to provide access to customized content after being generated. Accordingly, it is desirable to provide apparatus and methods for COLLECTIBLE MACHINE-READABLE CODES.

BRIEF DESCRIPTION OF THE DRAWINGS

The objects and advantages of this disclosure will be apparent upon consideration of the following disclosure, taken in conjunction with the accompanying drawings, in which like reference characters refer to like parts throughout, and in which:

FIG. 7B shows illustrative information generated in accordance with principles of the disclosure;

DETAILED DESCRIPTION

Figure 1:
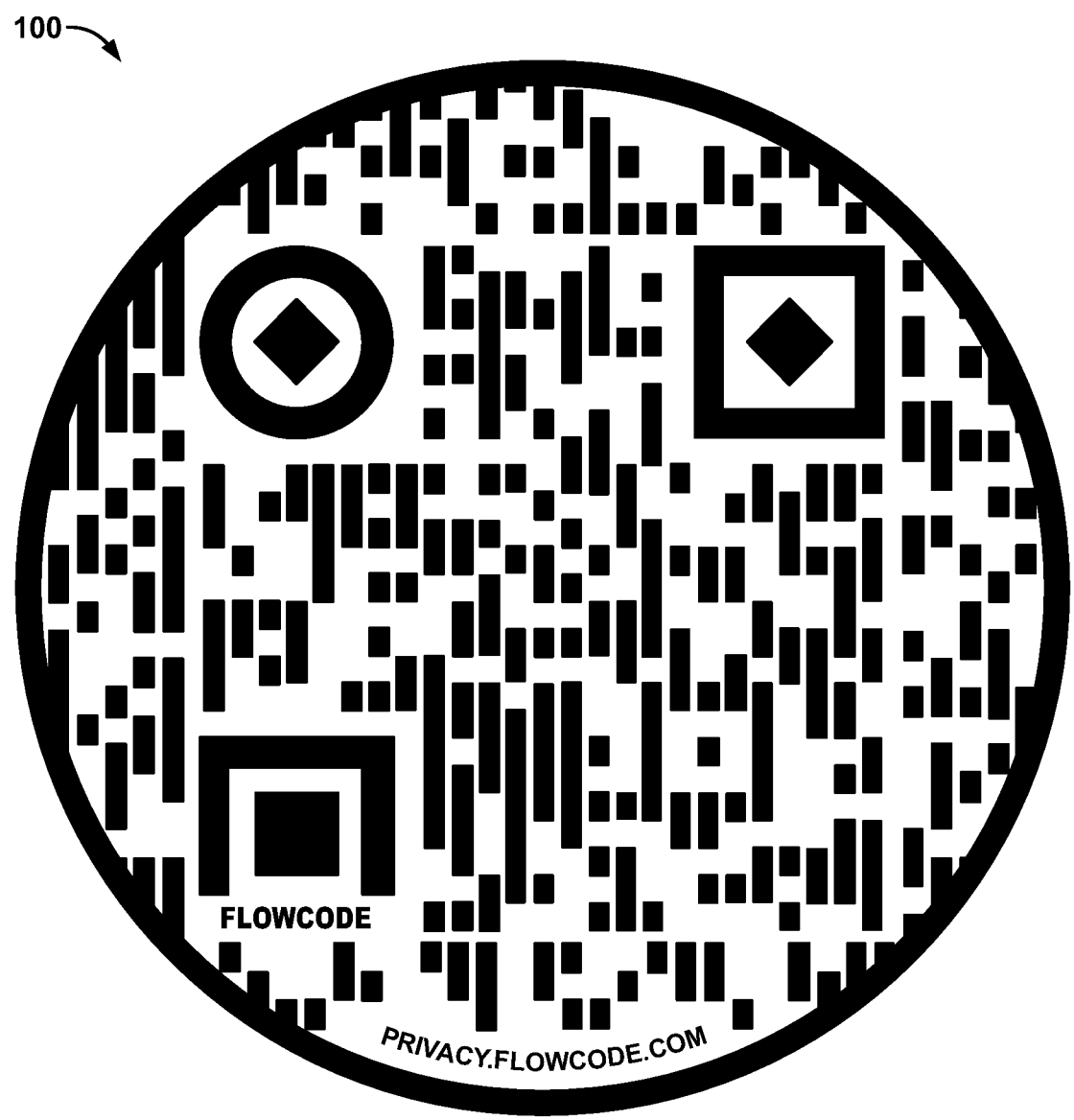
FIG. 1 shows an illustrative machine-readable label in accordance with principles of the disclosure.

Information encoded in a MRL may be captured optically, using a camera of a mobile device. The encoded information may be captured in any suitable manner. For example, the information may be captured using near field communication ("NFC"), Bluetooth, 5G communication between the MRL and a viewer's mobile device.

Methods may include using any suitable technology or protocol for capturing information encoded in an MRL. Any suitable technology for capturing information encoded in a MRL may be referred to herein as a "scan" of the MRL. A device that captures information encoded in a label may be referred to herein as a "scanning device." An illustrative scanning device may be a laptop, tablet, smartphone, other "smart" devices or any other suitable device for capturing, receiving, storing, transmitting and/or displaying electronic information.

There is procedural friction that prevents owners or creators from easily generating, downloading, printing and positioning a MRL so that it can be scanned by viewers to access desired content. This application describes technology for reducing the procedural friction by generating labels, printing them and distributing them, without any knowledge of the content that will be associated with a MRL, intended position or owner of the MRL. Such an MRL may be referred to in this application as a "collectible" MRL.

Advantageously, a collectible MRL may be shipped to potential owners or viewers. Collectible MRLs may be handed out during events. Collectible MRLs may be affixed to public access points. An owner and content may be associated with the distributed MRL after the MRL is printed and positioned in the real world.

Embodiments of the disclosed technology may be leveraged to provide dynamically configurable access to customized digital content associated with an MRL. A MRL may be designed, printed and distributed to viewers. Owners may then take ownership or activate a collectible MRL and associate customized content with the MRL.

Each owner that collects a MRL may have different needs or interests. A first owner may be interested in providing viewers information about a product. A second owner may be interested in providing viewers access to purchase a new product. A third owner may be interested providing viewers with contact information. Two or more owners may collect the same MRL.

At a time they are generated, a collectible MRL may be associated with a default scan destination. The default scan destination may be encoded in a data zone of the collectible MRL. The information encoded in a data zone of the collectible MRL may not be changeable. For example, the collectible MRL may be printed on a sticker or mounted on physical structure such as a wall, train or taxi.

Collectible MRLs may be configurable (e.g., associated with desired content) after being created and distributed. A collectible MRL may a lie dormant waiting for an owner to activate the collectible MRL. After activation, a collectible MRL may be referred to herein as an "active" or "activated" MRL."

A collectible MRL has no owner. A viewer may interact with a collectible MRL by scanning it. After scanning the collectible MRL, the default scan destination encoded in the data zone may trigger an activation process on the viewer's scanning device. The activation process may allow the viewer to claim ownership or activate the collectible MRL. The activation process may include prompting the scanning viewer to associated custom content that will presented in response to subsequent scans of the activated MRL. Content linked to an activated MRL may be configured or reconfigured over-the-air at any time after activation.

A collectible MRL may be defined by a collectible indicator field in a database record corresponding to the MRL. Any suitable indicator may be used to identify whether a MRL is in a collectible state. For example, a database record may include a collectible indicator field that is set to "true" for a collectible MRL. Changing the collectible field to "false" indicates that the MRL has been activated by an owner. Any other suitable schema may be used to identify whether a MRL is collectible. For example, a collectible MRL may have the word "collectible" stored in the collectible indicator field.

The database record corresponding to the MRL may include an owner field. The owner field for a collectible MRL may be set to "null." An MRL that has "true" value in the collectible filed and a "null" value in the owner field may be collectible.

The database record may link a collectible MRL to a default scan destination. A data zone of a collectible MRL may encode a unique identifier. The unique identifier may be a key or index value that links information stored in the database record to a particular MRL.

During the activation process, the collectible field of a database record associate with a MRL may be changed to "false" and the owner field set to a particular individual or entity. In some embodiments, an activated MRL may be assigned a time-to-live ("TTL"). After expiration of the TTL, the activated MRL may revert to a collectible state. The after expiration of the TTL, the collectible attribute field may be changed to "true" and the owner field changed to "null." When an activated MRL reverts to a collectible state, it becomes available to be collected by another owner.

An owner may maintain an activated MRL and prevent it from reverting to a collectible label even after the expiration of the TTL. An activated MRL may remain active provided that the MRL receives a threshold number of scans within the TTL period. An activated MRL may remain active provided that the owner pays a fee or maintains an account associated with the activated MRL. For example, the owner may be changed a fee each time the activated MRL is scanned. The owner may be changed a fee to maintain an activated MRL after expiration of the TTL.

A collectible MRL may be configurable. A collectible MRL may allow an owner to claim ownership of the MRL, position the MRL in a physical location and monitor scans of the MRL after activation. Monitoring scans of an activated MRL may include monitoring electronic activity that occurs on a webpage or in response to other custom content that is presented to a viewer in response to a scan of the activated MRL.

A collectible MRL may be associated with one or more restrictions. For example, a collectible MRL may be restricted to collection by a target owner. Only the target owner may be capable of activating the MRL. The target owner may be identified based on an association with a scanning device. The scanning device may in turn be identified based on a media access control ("MAC") address, IP address or any other unique device identifier. The target owner may be identified based on a unique identifier generated based on historical scan activity of the target owner. Activation of a collectible MRL may be restricted to defined set of target owners.

An eligible owner may be identified by actions taken. For example, an owner may be required to have activated a threshold number of MRLs before being allowed to activate a target collectible MRL. The target collectible MRL may be positioned in a high traffic area or otherwise strategically positioned.

Another illustrative restriction may include limiting when a collectible MRL may be activated. A timing restriction may require an owner to scan a collectible MRL during a target time in order to successfully activate the collectible MRL.

In some embodiments, restrictions may be imposed dynamically. For example, a restriction may be imposed after an owner activates a collectible MRL. The restriction may be imposed based on a number of viewer scans of the activated MRL. For example, custom content linked to an activated MRL may be locked post-activation.

A collectible MRL may be restricted to a limited set of activation options. For example, a collectible MRL may be distributed to viewers by an owner. A collectible MRL be configured to only allow a viewer to activate the MRL by linking the MRL to a target webpage that includes a URL hosted by the distributing owner. For example, the viewer may only activate the MRL by linking to another webpage that is also hosted by the owner. The other webpage may be a personal page of the viewer hosted by the owner.

The custom content may be locked so that a threshold number of activated MRL within a target geographic region all remain associated with related or identical custom content. When an activated MRL is locked, even the owner may not be able to change the custom content associated with the activated MRL.

The target owner(s) may activate a collectible MRL. The activated MRL, when scanned by a viewer may provide content customized for the viewer. Scanning an activated MRL may provide different content to different viewers. A target viewer may scan the activated MRL and access custom content provided by the owner. Some viewers may scan an activated MRL and will not be shown any content. Some viewers may scan the activated MRL and will always be directed to the default scan destination, even though the MRL has been activated for the target viewer(s).

A target viewer may be identified based on an association with a scanning device. The scanning device may in turn be identified based on a media access control ("MAC") address, IP address or other unique device identifier of the viewers scanning device. The target viewer may be identified based on a unique identifier generated based on historical scan activity of the target viewer.

In some embodiments, an activated MRL may be associated with dynamic custom content. Each instance of custom content may be available to be claimed or collected by a viewer. In such embodiments, when a viewer scans the collectible MRL, the viewer may activate the MRL to access a custom experience associated with the collectible MRL.

In some embodiments, once a viewer collects an experience associated with an activated MRL, a different experience may be linked to the MRL. The viewer may be allowed to download or otherwise save the accessed experience. When other viewers scan the MRL, those other viewers may access or collect different custom content than what was collected by the first viewer. In some embodiments, the custom content associated with an activated MRL may be updated by the owner after a threshold number of viewers access or collect the custom content.

In some embodiments, the different content may be randomly presented to a scanning viewer. In some embodiments, an activated MRL may provide a unique or "hidden" experience to a scanning viewer. For example, an activated MRL may be configured to present the hidden experience to the nth viewer that scans the activated MRL. Other examples of custom content may include customized purchase offers, videos, pictures, menus, previews or any other suitable content. A machine learning techniques (e.g., algorithms) may be deployed to determine custom content that will be provided to a scanning viewer.

In some embodiments, activating a first MRL may trigger auto activation of a second MRL. One or more MRLs may be automatically activated after an owner activates a threshold number of collectible MRLs. A first owner may activate a first collectible MRL. After the first MRL has been activated, a second collectible MRL may be automatically activated. The second MRL may be automatically associated with custom content that has been linked by the owner to the first MRL.

In response to activation of the first MRL, a plurality of collectible MRLs may be automatically activated. For example, when an owner activates a first MRL, a redirect service may activate two or more second MRLs that are positioned within a predetermined geographic distance of the first MRL. The plurality of MRLs may be activated for any viewer that scans the MRL or for a target set of viewers.

The second MRL may be auto activated for target set of viewers. The target set of viewers may be identified based on each viewer in the target set sharing one or more attributes in common with the owner that activated the first MRL. A set of second MRLs may be activated for a viewer or target set of viewers. The set of second MRLs may be activated based on their geographic location relative to the first MRL. The set of second MRLs may be activated based on their geographic location relative to one or more members of the target set of viewers.

The second MRL may be activated for the target viewer and not for any other viewer. In some embodiments, activating a MRL for a target viewer or a target set of viewers may include displaying customized content when the target viewer scans the activated MRL. Any other viewer that scans the activated MRL may be directed to the default scan destination or shown content different than what would have been presented to the target viewer.

Methods for creating a digital touch point on a tangible, offline surface are provided. Methods may include generating an MRL. The MRL may be a static MRL. The MRL may encode a default scan destination. The default scan destination may be encoded in a data zone of the MRL. Methods may include affixing the MRL to the tangible, offline surface. An illustrative tangible, offline surface may include printing the MRL on a substrate such as paper, plastic or metal. Affixing the MRL to the tangible, offline surface may prevent alteration to the information encoded in the data zone.

Methods may include receiving a first request for access to the default scan destination. The first request may be triggered by a potential owner scanning the MRL. The first request for access to the default scan destination may be received from a device that scanned the MRL and extracted the default scan destination from the data zone of the MRL. Methods may include detecting that the default scan destination is not linked to a custom scan destination. For example, the MRL may be "collectible." In response to receiving the first request, methods may include prompting for a custom scan destination that will be presented in response to subsequent scans of the MRL.

Prompting for the custom scan destination may include providing software tools for generating custom content that will be displayed when the MRL is scanned. The software tools may include an interface for entering a URL or other web address. The software tools may include an interface for creating web-accessible content. The created content may be displayed when an activated MRL is scanned.

The software tools may auto-generate content based on captured scan event details or a Consumer Intent Graph ("CIG") associated with the scanning viewer. Illustrative scan event details may include a scan time, geographic location of scanned MRL or scanning device, identity of viewer, identity of scanning device, software running on the scanning device, manufacturer of the scanning device, owner of the scanned MRL, weather at time of scan or other information that may be correlated to a scan of the MRL.

Scan event details may be captured by a cookie resident on a browser of the viewers scanning device. Scan event details may be captured by a pixel resident on a webpage visited by the viewer. Scan event details captured by a cookie or pixel may be stored on the viewer's mobile device.

A CIG may refer to graphical connections linking offline activity to online activity . The CIG may link offline activity associated with a MRL to online activity associated with multiple viewers. The CIG may link trackable electronic activity of a viewer in response to scanning an MRL. The CIG may link scan event details to online activity of the viewer taken in in response to scanning the MRL. For example, the CIG may link a geographical location of a scanned MRL to actions taken by multiple viewers after scanning the MRL. The CIG may index or rank actions taken by viewers after scanning an MRL. The CIG may include relationships that represent a degree of relevancy for content that may be presented to a viewer in response to scanning an MRL.

Scanning of an activated MRL may submit the default scan destination encoded in the scanned label to a redirect service. The redirect service may be a software application resident on the mobile device of the first user used to scan the label. The redirect service may be a cloud-based application hosted on a remote computer server. The redirect service may formulate content, or trigger an action associated with the default scan destination or an MRL.

The redirect service may utilize computer-executable instructions, such as program modules, executed by a processor. Generally, program modules include routines, programs, objects, components, data structures, etc. that perform particular tasks or implement particular abstract data types. For example, the redirect service may be a software application stored within non-transitory memory and/or other storage medium of a computer system. The non-transitory memory of a computer system may store other software applications such as an operating system, application programs, and an associated database. The software application may provide executable instructions to a processor circuit that enable components of the computer system to perform various functions.

Some or all of computer executable instructions of the redirect service may be embodied in hardware or firmware. The hardware and firmware may include one or more circuit boards. In some embodiments, the circuit boards may be integrated into a single chip. The chip may be silicon-based.

The redirect service may support establishing network connections to one or more remote computers or networks. Illustrative network connections may include a local area network ("LAN"), a wide area network ("WAN") and may also include other networks. When used in a LAN networking environment, the redirect service may connect to each other on the LAN through a network interface or adapter. The redirect service may support establishing communications over a WAN, such as the Internet. The existence of any of various well-known protocols such as TCP/IP, Ethernet, FTP, HTTP and the like is presumed, and the redirect service may operate in a client-server configuration to permit retrieval of web pages from a web-based server. Web browsers (e.g., on a viewer or owner device) can be used to display and manipulate data on web pages.

Cloud computing and virtualization implementations of the redirect service may be designed to run on a physical apparatus supplied externally by a hosting provider, a client, or other virtualized platform. The redirect service may be operational with distributed computing environments where tasks are performed by remote processing devices that are linked through a communications network. In a distributed computing environment, program modules of the redirect service may be located in both local and remote computer storage media including memory storage devices. The redirect service may rely on a network of remote servers hosted on the Internet to store, manage, and process data (e.g., "cloud computing" and/or "fog computing").

The redirect service may include computer executable instructions for invoking user functionality related to communication, such as email, short message service ("SMS"), and voice input and speech recognition applications. The redirect service may utilize one or more algorithms or other software applications that generate QR codes based on design choices entered by a user or any other suitable tasks.

The redirect service may capture and process data in different data or communication formats. For example, the redirect service may use different data structures to store captured data. The redirect service may utilize different communication protocols to transmit captured data or communicate with other systems. Despite such operational differences, the redirect service may be configured to operate substantially seamlessly with those other systems. Interoperability may allow an owner to activate MRLs using a first system, utilize a software engine running on a second system to trigger electronic display of an MRL, capture viewer scans from a third system and utilize a fourth system to process captured viewer scans.

The redirect service may include a user interface ("UI"). The UI may provide access to software tools for an owner to associate custom content with an MRL. The UI may present performance metrics associated with a MRL to an owner. The UI may be utilized to present custom content on a scanning device to a viewer. The UI may format the custom content based on a configuration setting, hardware or software associated with the scanning device.

An exemplary redirect service may utilize a CIG and scan event details indexed therein to determine custom content to associate with a MRL when an owner activates the MRL. The redirect service may include one or more machine learning or other forms of artificial intelligence to determine actions/content to associated with an MRL. Illustrative machine learning techniques that may be employed by the redirect service include AdaBoost, Naive Bayes, Support Vector Machine, Random Forests, Artificial Neural Networks, Deep Neural Networks and Convolutional Neural Networks.

Based on information encoded in the scanned label, associated scan event details, user profile and other suitable information stored in a CIG, the redirect service may compute a content index score for potential content that will be associated with an activated MRL. Based on the content index score for potential content, the redirect service may present content having the highest intent index score to the activating owner. The redirect service may present the highest scoring content by redirecting the owner's browser to a URL of a webpage that presents the highest scoring content.

Methods may include determining a custom scan destination for an activated MRL. An intent index score may be computed for potential content based on the CIG. The intent index score may include probabilistic scores that predict whether a viewer is likely to take a specific action or utilize specific content in response to scanning an MRL. For example, the intent index score for a specific content may have a range of 0 (unlikely viewer will take action when presented with content) to 100 (viewer likely to take action when presented with content).

The owner may be prompted to confirm the custom scan destination generated by the redirect service. Methods may include linking the default scan destination to the custom scan destination. After linking the default scan destination to the custom scan destination, in response to receiving a request for access to the default scan destination (e.g., a viewer scan), methods may include providing access to the custom scan destination instead of the default scan destination.

The data zone of a MRL may encode information that uniquely identifies the MRL. For example, the data zone may encode the following information: www.[Default_Scan_Destination].com/123. The segment of the encoded information "123" may uniquely identify the MRL. The segment "Default_Scan_Destination" may correspond to the default scan destination. When a customer scans a collectible MRL, the user may be directed to the default scan destination.

When a viewer scans an activated MRL, the custom scan destination associated with the MRL may be located based on the informational segment encoded in data zone that uniquely identifies the scanned MRL. When a viewer scans an activated MRL, the viewer's scanning device may submit a request to load the default scan destination extracted from the data zone of the MRL. After the scanned MRL is affixed to an offline, tangible medium, information encoded in the data zone cannot be altered. However, after the MRL has been activated, methods may include locating a custom scan destination based on the informational segment encoded in data zone that uniquely identifies the scanned MRL.

The custom scan destination may be indexed within a database using the informational segment encoded in data zone as a key that uniquely identifies an activated MRL. Methods may include, based on the unique identifier accessing the redirect service and locating a custom scan destination associated with an activated MRL. In response to capturing a scan of the activated MRL, methods may include loading, on the scanning device, content associated with the custom scan destination.

The MRL may be one of a plurality of MRLs. Linking the default scan destination of the MRL to the custom scan destination may trigger linking of the custom scan destination to the default scan location of each of the plurality of MRLs. For example, activating and associating custom content with a target MRL may trigger automated activation of one, two or more MRLs.

Additional MRLs may be automatically activated because they are within a target geographic region or target distance of the target MRL. Additional MRLs may be activated based on a unique identifier associated with the target MRL. For example, when the target MRL is activated, additional MRLs that are associated with a unique identifier that is within a predetermined numerical range of the unique identifier of the target MRL may also be automatically activated.

The predetermined numerical range may be a magnitude or other value added or subtracted to the unique identifier of the target MRL. The predetermined numerical range may represent MRLs that have information encoded in their data zone that hashes to a predetermined value or range of values. In some embodiments, the automatically activated MRLs may be randomly determined.

The additional MRLs automatically activated may each be collectible MRLs that are associated with particular owner. For example, the additional MRLs may have a "true" value in the collectible field of the databased record, and have a particular owner already listed in the owner field.

Collectible MRLs may be produced that include designs evidencing an association with a target owner. The collectible MRLs may include a logo or color scheme associated with a target company. When the particular owner (e.g., company representative) activates one of the collectible MRLs, the redirect service may activate additional collectible MRLs that list the activating owner in the owner field.

Methods may include tracking an activation time a MRL was linked to a custom scan destination. After expiration of predetermined period after the activation time, methods may include decoupling the custom scan destination from the default scan destination. The decoupling may return an activated MRL to a collectible state. After being returning to the collectible state, the MRL may be eligible for activation by another customer.

Machine learning techniques alter the content associated with the custom scan location and presented to the second device. For example, methods may include monitoring activity of on a landing page associated with the custom content. Methods may include dynamically reordering the links displayed on the landing page. Methods may include reordering the links on the landing page based on a location of the scanning device, captured scan event details, or a CIG associated with the scanning user.

An owner that activates a MRL may elect to have the redirect service choose custom content that will be presented to a scanning viewer. The owner may specify custom content options and instruct the redirect service to apply machine learning techniques to select one or more of the options for presentation to a scanning viewer.

Machine learning techniques may alter custom content associated with a MRL based on a number of times the activated MRL is scanned. Machine learning techniques may alter the custom content for a target viewer based on a number of times the activated MRL is scanned by a target viewer. For example, a different webpage may be presented to a scanning viewer after an activated MRL is scanned a threshold number times. If an activating owner has not created an account, the default scan destination may be presented to a viewer after an activated MRL is scanned a threshold number of times.

A system for creating a digital touch point is provided. The digital touch point may be affixed to a tangible, offline surface. The digital touch point may be presented electronically. For example, the digital touch point may be presented on a screen. The digital touch point may be presented holographically or projected onto a surface. The digital touch point may include an MRL. The MRL may be a static MRL.

A data zone of the MRL may encode a default content destination. The system may include a scanning device that extracts the default content destination from a scanned MRL. The scanning device may formulate a first request for access to the default content location encoded in the MRL.

The system may include a redirect service. The redirect service may receive the first request from the scanning device. The first request may be received from a potential owner. In response to receiving the first request, the redirect service may prompt the scanning device to associate custom content with the MRL. The redirect service may receive the custom content from the scanning device. The redirect service may link the custom content to the MRL.

The redirect service may provide the custom content to a viewer in response to receiving a request from the viewer to access the default content location. The viewer request may be a scan of the MRL. The viewer request may be received from a scanning device of the viewer. The redirect service may specially format the custom content for display on the viewer device. The redirect service may format the custom content for display on the viewer device based on one or more scan event details captured by the viewer device.

The MRL may be a first MRL. The default content location may be a first default content location. The redirect service may receive a request from a viewer scanning device for access to a default content destination extracted from a second MRL. In response to receiving the request associated with a scan of the second MRL, the redirect service may activate the second MRL and link the custom content associated with the first MRL to the second MRL. In response to subsequent viewer scans of the second MRL, the redirect service may provide the custom content to viewers that scan the second MRL.

The system may include a MRL generator. The MRL generator may allow an owner to customize the appearance and content linked to a collectible MRL. The MRL generator may implement a workflow for creating and configuring a collectible MRL. For example, the MRL generator may be programmed such that a custom library of design choices (e.g., images, colors and shapes), custom content options and restrictions are available when using the MRL generator to create a collectible MRL for the owner. The MRL generator may be accessed by third parties. The MRL generator may be configured such that third parties may only create collectible MRLs that are subject to one or more restrictions imposed by an owner.

The MRL generator may produce an MRL that is optimized for scan recognition when the MRL is displayed electronically, such as on a screen. The optimized copy of the MRL may encode the default scan destination. Because a default scan destination of the MRL is linked to custom content, when the optimized copy of the MRL is scanned, the linked custom content will be presented to a scanning viewer.

A MRL generator may be provided by first owner. The first owner may allow a second owner to create and generate MRLs that are linked to custom content defined by the second owner. The first owner may define a process flow for the second owner to activate a MRL created using the MRL generator provided by the first owner. The process flow may integrate branding, content, and/or requirements of the first owner.

The second owner may activate a MRL as part of the creation process using the MRL generator. For example, the MRL generator may prompt the second owner for custom content that will be associated with a MRL output by the generator. The second owner may activate an MRL created by the MRL generator after the MRL is created.

For example, the second owner may use the MRL generator to design and create a target MRL. The second owner may order stickers or other tangible copies of the target MRL. After the second owner receives the ordered tangible copies of the target MRL, the second owner may activate the target MRL by scanning a tangible copy MRL.

The second owner may collect or activate an MRL created by the MRL generator subject to one or more restrictions imposed by the first owner. For example, the first owner may allow the second owner to associate any custom content with the MRL and require that scan event details and scan analytics associated with viewer scans of the MRL are accessible to the first owner.

A MRL may be one of a plurality of MRLs. After at least one of the MRLs is linked to the custom content, the redirect service may locate at least one other MRL included in the plurality. The redirect service may link the at least one other MRL to the custom content. The redirect service may locate the at least one other MRL based on a geographic proximity each of the MRLs. The redirect service may locate the at least one other MRL based on a sequential proximity of the unique identifies of each of the MRLs included in the plurality.

A MRL may be associated with two or more instances of custom content. The redirect service may decide which instance of custom content to present in response to a viewer scan of an activated MRL. For example, the redirect service may provide first custom content associated with a MRL in response to scans that occur during a first time period. The redirect service may provide second custom content in response to scans of the MRL that occur during a second time period. The redirect service may apply machine learning techniques to determine which instance of custom content to present to a viewer.

The machine learning techniques may determine which instance to present based on scan event details captured at the time of a viewer scan. For example, a machine learning technique may select custom content based on a geographic or temporary proximity of two scans.

The redirect service may be configured to "time share" an MRL. A first owner may activate a MRL and associate first custom content with the MRL during a first time window. The MRL may remain collectible and ownerless during a second time window. The first and second time windows may not overlap. A second owner may activate the MRL during the second time window. The second owner may associate second custom content with the MRL. The first custom content may be presented in response to a viewer scan of the MRL during the first time window. The second custom content may be presented in response to a viewer scan of the MRL during the second time window.

In some embodiments a MRL may be locked in a collectible state. For such locked MRLs, machine learning techniques may determine custom content to present in response to each viewer scan of the MRL. A redirect service may dynamically determine content to present to a viewer that scans the locked MRL. To determine custom content for the scanning viewer, the redirect service consider the following illustrative may factors: a CIG associated with the scanning viewer, a CIG associated with the scanned MRL, viewer scan history, geographical location of the scanned MRL, presentation of MRL (e.g., electronic or printed), time/date of scan, manufacturer of scanning device, businesses and attractions located within predetermined distance of scanned MRL, content presented in response to scans of other activated MRLs within predetermined distance of currently scanned MRL.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method and/or apparatus described herein.

Apparatus embodiments may omit features shown and/or described in connection with illustrative apparatus. Apparatus embodiments may include features that are neither shown nor described in connection with illustrative apparatus. Features of illustrative apparatus embodiments may be combined. For example, an illustrative apparatus embodiment may include features shown or described in connection with any other illustrative apparatus and/or method embodiment described herein.

A potential owner or viewer may begin an interaction with a MRL by scanning MRL 100 illustrated in FIG. 1. MRL 100 may encode any suitable information such as a Uniform Resource Locator ("URL"), contact information associated with a business or other alphanumeric information. MRL 100 may encode instructions, that when scanned, trigger the scanning device to perform a target action or function. The information encoded in MRL 100 may be extracted by a native application or a third-party application running on a scanning device.

MRL 100 illustrates an encoded pattern that conforms to an encoding specification for a Quick Response ("QR") code. The appearance of a standard QR code may be defined by one or more standards published by the International Organization for Standardization ("ISO") of Geneva, Switzerland. Illustrative standards published by the ISO include ISO/IEC 18004:2015 and ISO/IEC 24778:2008 which are hereby incorporated herein by reference in their entireties. MRLs described in connection with this disclosure may be any suitable scannable MRL. In other examples, a MRL may be a linear barcode or a two-dimensional matrix barcode, e.g., Aztec code, ShotCode, SPARQCode, and the like.

MRL 100 may be a "static" MRL. A "static" MRL may encode a set of instructions that is repeatedly scanned by multiple viewers and/or scanning devices. Each of scan of MRL 100 extracts the exact same information from MRL 100. Even though MRL 100 may be static, the particular content that is presented to a viewer in response to a scan of MRL 100 may be dynamically customized for each viewer.

Figure 2:
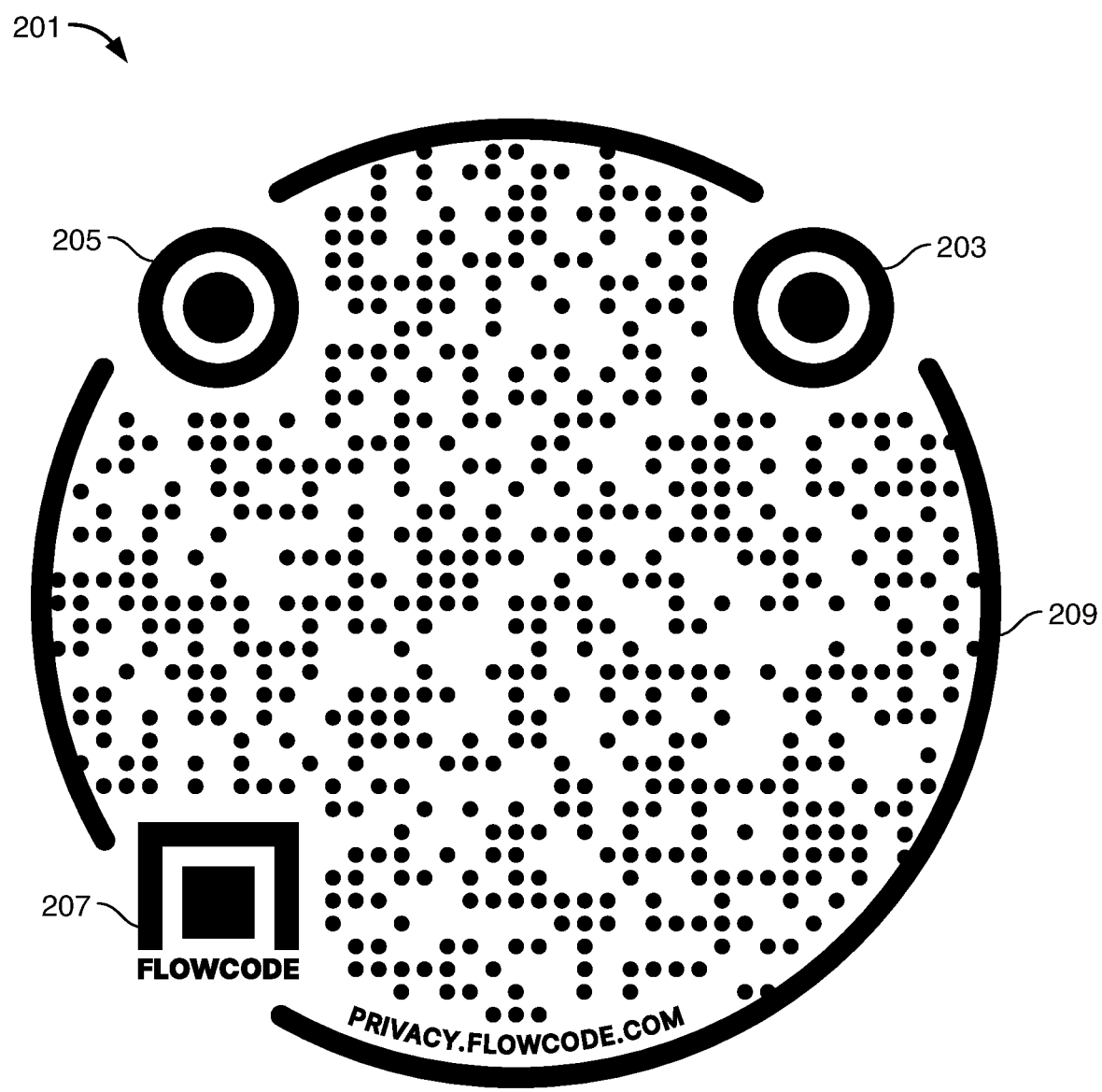
FIG. 2 shows an illustrative machine-readable label in accordance with principles of the disclosure.

FIG. 2 shows illustrative MRL 201. MRL 201 may be optimized for scan recognition when displayed electronically. For example, when displayed electronically, MRL 201 may be more reliably scannable than MRL 100 (shown in FIG. 1). An electronic display may include presenting MRL 201 on a screen, using a light source, holographically or any other electronic presentation. To optimize scan readability when MRL 201 is presented electronically, position markers 203, 205 and 207 protrude beyond outer perimeter 209.

Figure 3:
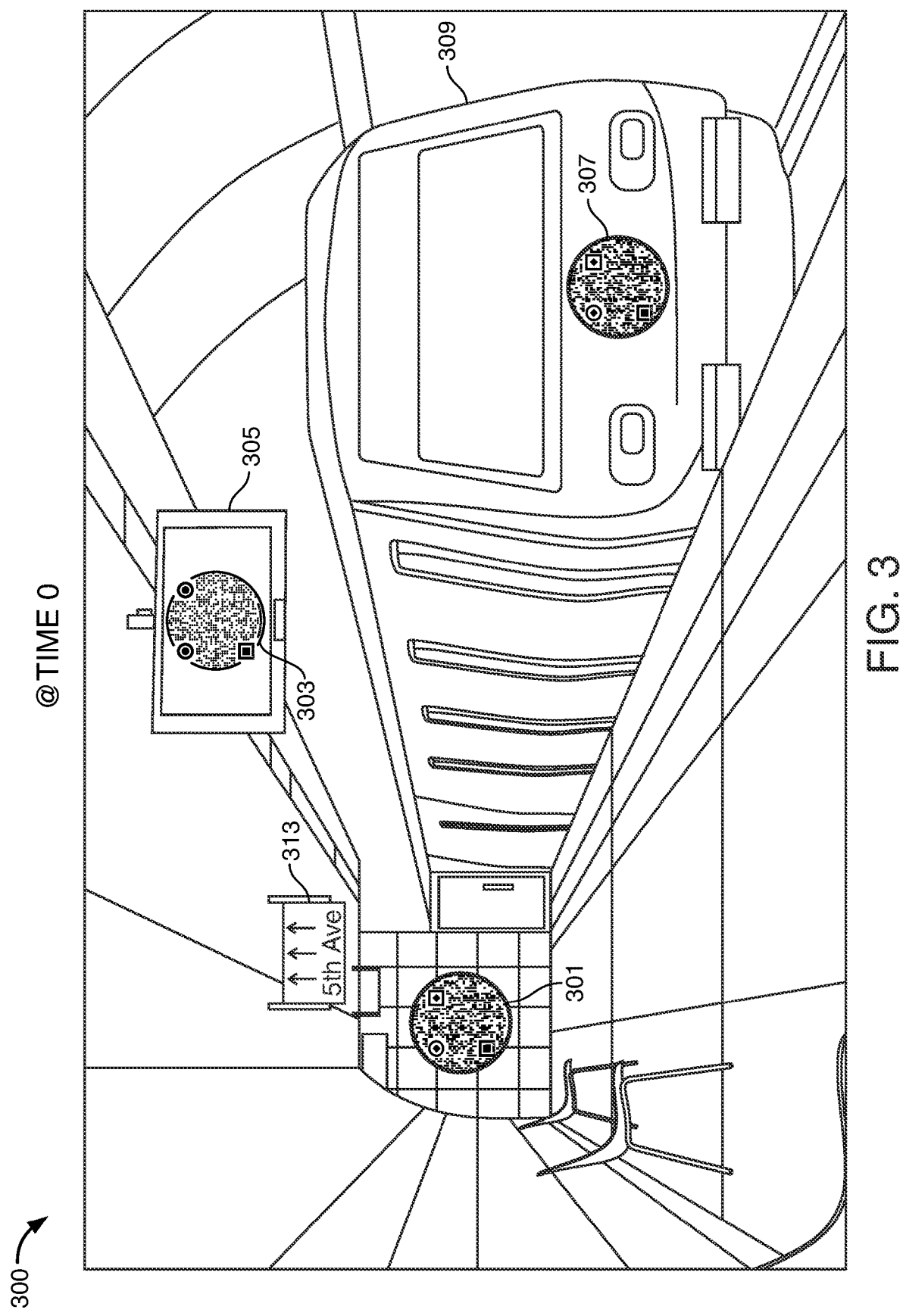
FIG. 3 shows an illustrative scenario in accordance with principles of the disclosure.

FIG. 3 shows illustrative scenario 300. Scenario 300 shows collectible MRLs 301, 303 and 307 at $time_0$ in train station 313. MRL 301 is mounted on a wall of station 313. MRL 303 is displayed electronically on screen 305. MRL 307 is mounted on train 309. At $time_0$, each of the MRLs shown in FIG. 3 are collectible and not yet associated with an owner or any custom content. At $time_0$, a scan of any of the MRLs positioned in train station 313 may trigger a workflow for activating the scanned MRL.

Figure 4:
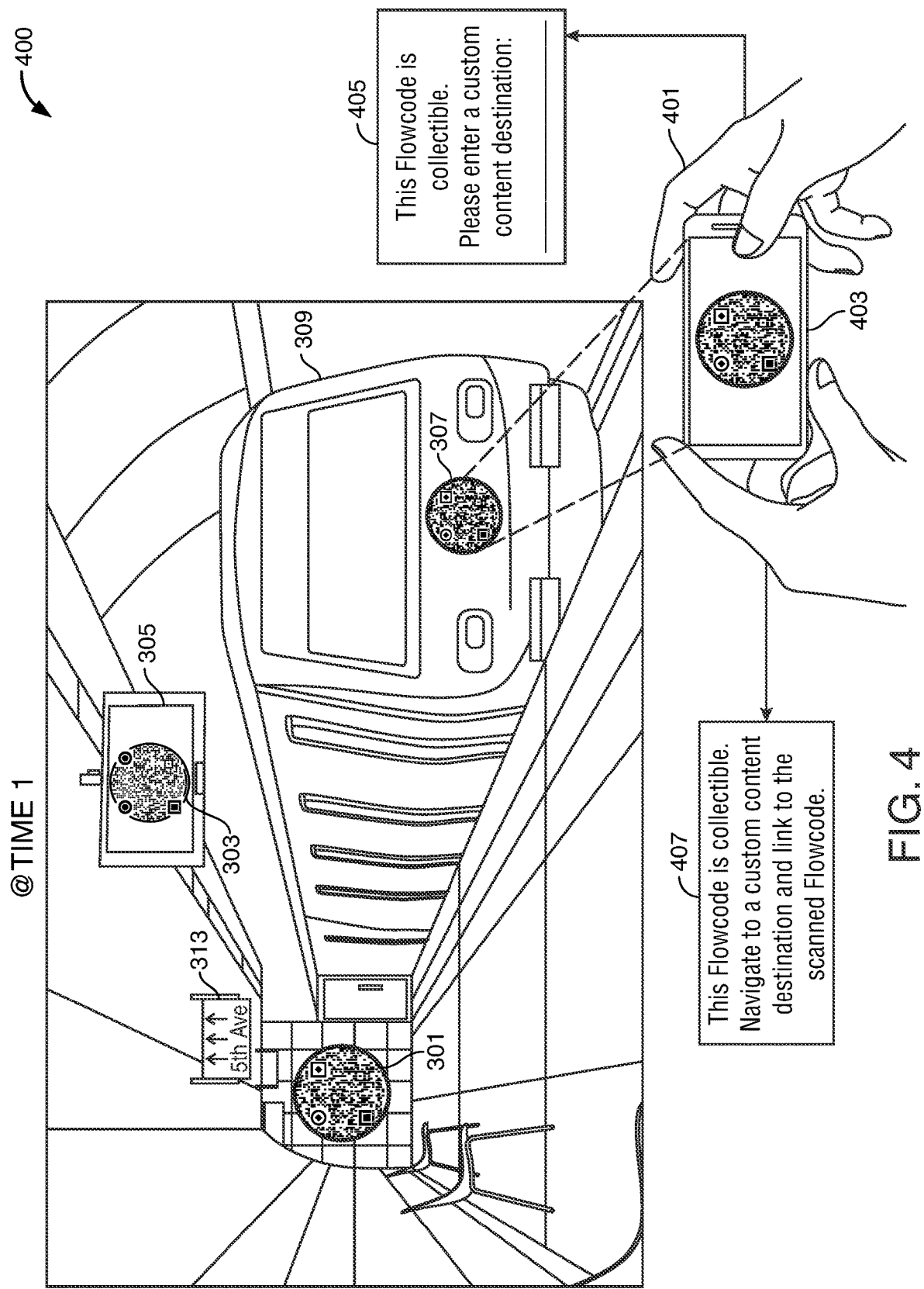
FIG. 4 shows an illustrative scenario in accordance with principles of the disclosure.

FIG. 4 shows illustrative scenario 400. Scenario 400 shows MRLs 301, 303 and 307 at $time_1$ in train station 313. Scenario 400 shows owner 401 scanning collectible MRL 307 with scanning device 403. In some embodiments, MRL 307 may include NFC capability. When MRL 307 includes NFC capability, MRL 307 may be scanned from an inside of train 309.

Scanning MRL 307 may trigger a process flow for activating MRL 307. FIG. 4 shows that owner 401 may be presented options 407 and/or 405 for activating MRL 307. Activation option 405 shows that owner 401 is requested to enter a custom content destination that will be linked to MRL 307. The custom content destination may be an informational item such as a web address or an application that will be launched in response to a subsequent viewer scan of MRL 307.

Activation option 407 shows that owner 401 is requested to navigate to a custom content destination. The custom content destination may be a web address, an application resident on scanning device 403, a picture, video or any suitable content that owner 401 wishes to be presented when MRL 307 is subsequently scanned by a viewer.

An application running on scanning device 403 may control the process for activating MRL 307. In some embodiments, an application running on scanning device 403 may interact with a redirect service to activate MRL 307. For example, the redirect service may be a cloud-based application hosted on a remote computer server. An application running on scanning device 403 may provide access to the remote redirect service. The application running on scanning device 403 may capture one or more scan event details such as a location of scanning device 503 (e.g., inside station 313) and link the captured location to MRL 307.

In some embodiments, the application running on scanning device during activation of MRL 307 may include an instance of a redirect service. The instance of the redirect service may run locally on scanning device 403 and generate custom content options that are selectable by owner 401 when activating MRL 307. A viewer scanning device may also run a local instance of the redirect service. Running a local instance of the redirect service on a viewer scanning device may reduce latency between a scan of a MRL 307 and a loading of custom content on the viewer's scanning device.

Figure 5:
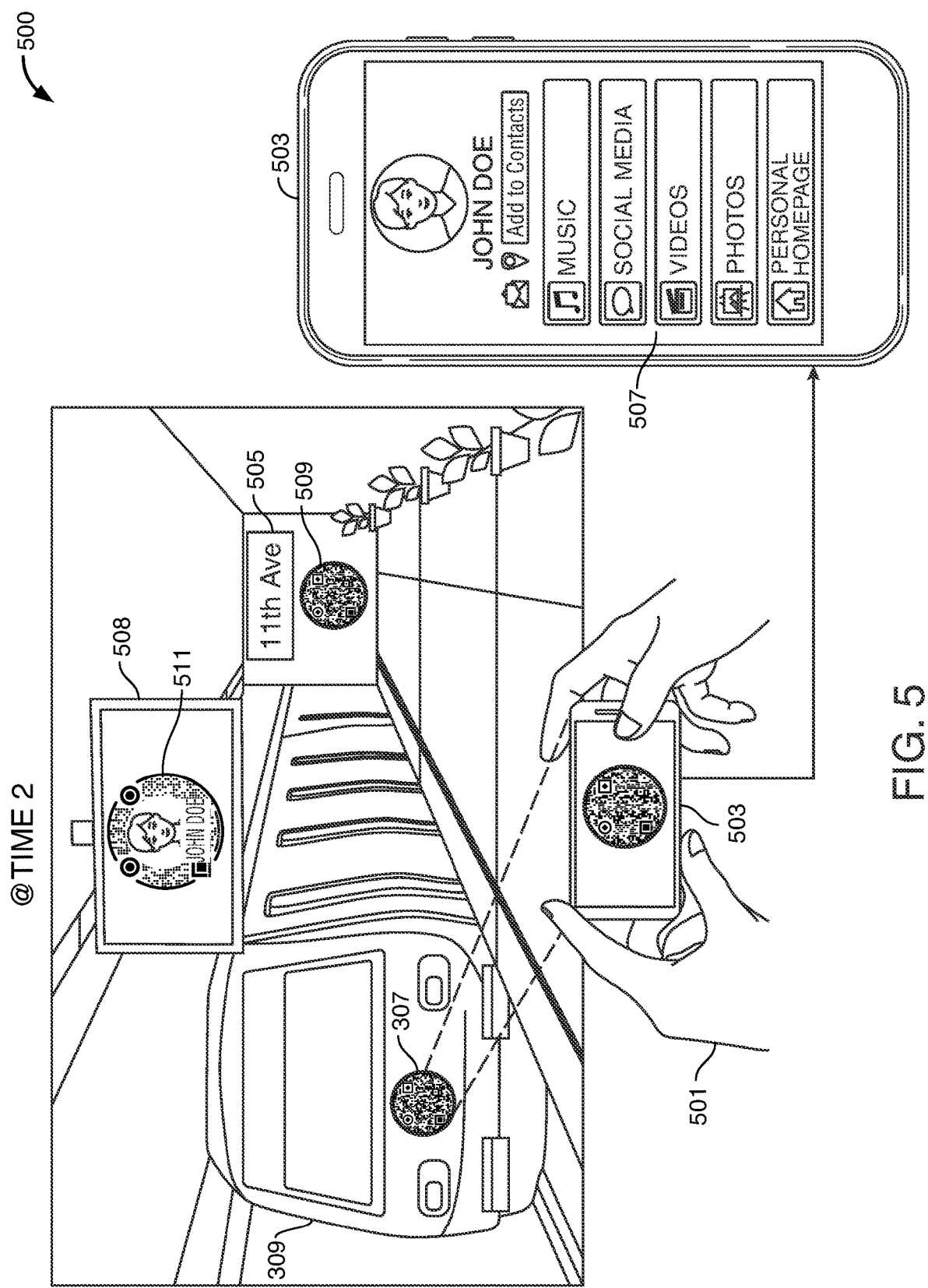
FIG. 5 shows an illustrative scenario in accordance with principles of the disclosure.

FIG. 5 shows illustrative scenario 500. Scenario 500 shows that at $time_2$, train 309 (shown in FIG. 3) has arrived at station 505. In station 505, viewer 501 scans MRL 307. As shown in FIG. 4, owner 401 activated MRL 307 at $time_1$. Scenario 500 shows that when viewer 501 scans MRL 307 in station 505, viewer 501 is shown custom content 507 that owner 401 has linked to MRL 307. Custom content 507 shows biographical information about owner 401.

FIG. 5 also shows MRL 509 affixed to a wall of station 505. MRL 509 may still be collectible at $time_2$. MRL 509 may be collectible by viewer 501. In some embodiments, a redirect service may automatically link MRL 509 to custom content 507. The redirect service may temporally link MRL 509 to custom content 507. For example, owner 401 may have activated MRLs 301, 307 and 305 at $time_1$ in station 313. Owner 401 may have associated the activated MRLs in station 313 with custom content 507.

The redirect service may detect that owner 401 has activated three MRLs in station 313 at $time_1$ and associated each of the activated MRLs with custom content 507. Based on a detected desire of owner 401 to link activated MRLs in station 313 to custom content 507, the redirect service may automatically activate and link MRL 509 in station 505 to custom content 507.

In some embodiments, a redirect service may link MRL 509 to custom content 507 only at $time_2$. For example, the redirect service may detect (based on scans of a MRL 509 at different stations) or be aware that MRL 307 is affixed to train 309. The redirect service may ascertain a travel schedule for train 309. The redirect service may determine that train 309 is expected to arrive at station 505 at $time_2$. The redirect service may link MRL 509 to custom content 507 at $time_2$. At $time_2$ train 309 may have arrived, or is expected to arrive at, station 505. When train 309 leaves station 505, the redirect service may return MRL 509 to a collectible state.

FIG. 5 also shows that electronic billboard 508 displays MRL 511. MRL 511 has been optimized for scan recognition on an electronic display. Scenario 500 also shows that MRL 511 has been customized based on custom content 507 that has been linked to MRL 307. Machine learning techniques may generate a custom designed MRL based on the content an owner has associated with an activated MRL. The machine learning techniques may extract a logo, color scheme or other design choices associated with a previously activated MRL. The machine learning techniques may adapt the extracted design choices to customize the appearance of the activated MRL or another MRL.

Scenario 500 shows that machine learning techniques have generated MRL 511 based on the custom content owner 401 linked to MRL 307. The machine learning techniques may also trigger a display of MRL 511 on electronic billboard 508 when train 309 enters station 505 at time$_2$. A redirect service may deploy the machine learning techniques for generated custom designed MRLs or linking custom content to an MRL.

Figure 6:
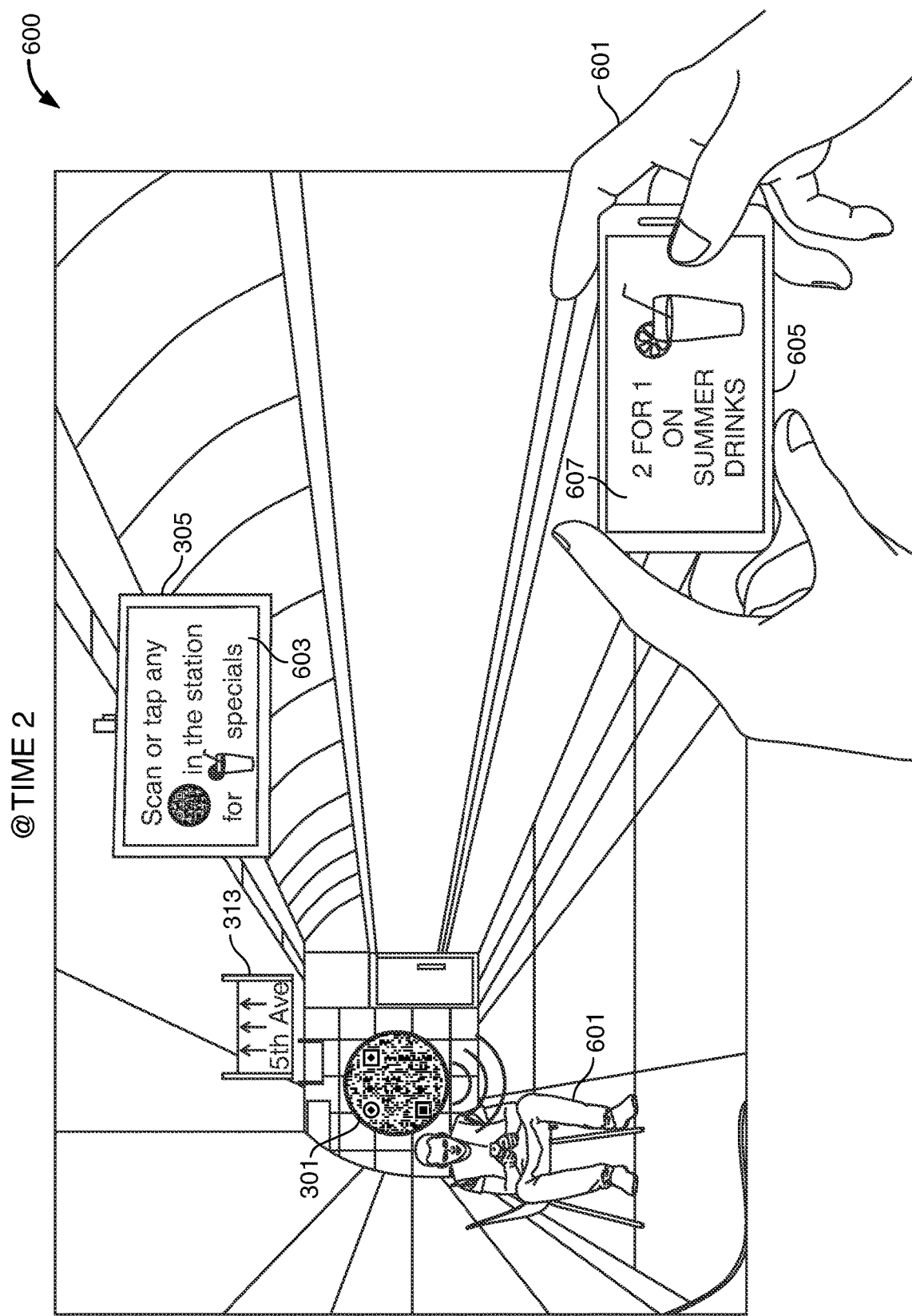
FIG. 6 shows an illustrative scenario in accordance with principles of the disclosure.

FIG. 6 shows illustrative scenario 600. Scenario 600 shows station 313 (also shown in FIGS. 3 and 4) at time$_2$. Scenario 600 shows that at time$_2$, train 309 has left station 313. As shown in FIG. 5, at time$_2$ train 309 has arrived at station 505. Scenario 600 shows that at time$_2$, viewer 601 scans MRL 301 affixed to a wall of station 313. FIG. 6 shows that viewer 601 scans MRL 301 using NFC technology.

Scenario 600 shows that viewer 601 is presented with custom content 607 on scanning device 607. An owner may activate a collectible MRL without scanning the MRL. For example, the owner may log onto a secure portal and view a map of collectible MRLs within a geographic region. The owner may choose collectible MRLs that it wishes to activate and associate with custom content.

In FIG. 6, MRL 301 may have been collected by a bar, restaurant or other eatery within a threshold distance of station 313. The eatery may configure MRL 301 to be active when viewers are expected to arrive at station 313 or are waiting for a train to arrive at station 313. The eatery may configure MRL 301 to be owned by and associated with specific custom content based on potential scan event details.

For example, MRL 301 may be associated with a drink menu showing specials on cold drinks when the temperature is over a threshold value. When the temperature in below the threshold value, MRL 301 may be associated with a menu determined based on a time of day (e.g., lunch menu between 11 am and 3 pm or dinner menu after 4:30 pm). When the temperature is below the threshold value, MRL 301 may be associated with a different business or individual. When the temperature is below the threshold value, MRL 301 may be collectible.

FIG. 6 shows that screen 305 displays a message directing views to scan MRL 301. The message displayed by screen 305 may be controlled by a redirect service. The redirect service may formulate a displayed message based on custom content associated with MRL 301. The message displayed on screen 305 may indicate the owner of a MRL or content associated with an MRL.

More generally a redirect service may formulate messages that inform potential viewers of content associated with an MRL. The redirect service may push the formulated messages to screens, electronic billboards, scanning devices (e.g., as text messages or other alerts) to inform potential viewers of custom content that is associated with an MRL.

For example, the redirect service may send a text message to a potential viewer that is detected to be within a threshold distance of an MRL. The text message may inform the potential viewer of custom content associated with a nearby MRL. The redirect service may push messages or alerts to potential viewers based on determining that custom content associated with an MRL is relevant to the potential viewer. "Relevancy" may be determined based on a CIG associated with a potential viewer or the available MRL. "Relevancy" may be determined based one or more potential scan event details that would be captured when the potential viewer scans the MRL.

In some embodiments, MRL 301 may be activated by two or more owners. For example, MRL 301 may be activated by owner 401 (shown in FIG. 4) and the bar/restaurant. A redirect service may determine whether to present custom content 507 (associated with owner 401) or custom content 607 (associated with the bar/restaurant) to a viewer that scans MRL 301 in station 313 at time$_2$. Screen 305 may display a message that reflects content associated with MRL 301 at particular time.

The redirect service may determine to present custom content 607 or 507 to viewer 601 based on one or more scan event details captured at time$_2$ when viewer 601 scans MRL 301. Illustrative scan details may include whether train 309 is at station 313, when a train is expected to arrive at station 313, weather outside station 313, temperature inside or outside station 313, geographic location of station 313, location of MRL 301 within station 313, device used by scanning viewer, operating system of scanning device, other activity of viewer 601 taken in response to scans of other MRLs, a CIG associated with viewer 601, and/or a CIG associated with MRL 301.

Figure 7A:
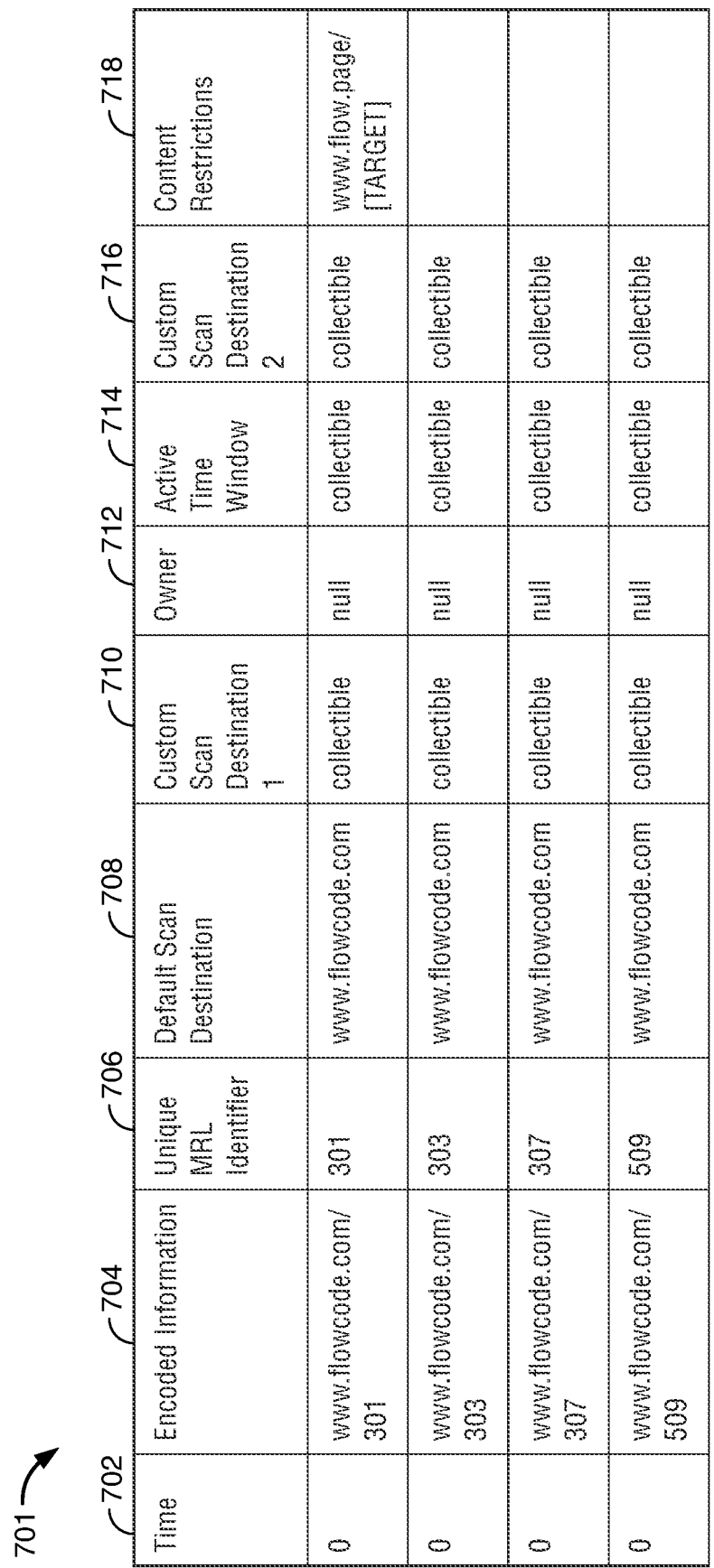
FIG. 7A shows illustrative information generated in accordance with principles of the disclosure.

FIG. 7A shows illustrative tabulated information 701 that may be utilized by a redirect service. Information 701 shows properties of MRLs shown in FIGS. 3, 4 and 6 at time$_0$ (column 702). Information 701 may represent illustrative database records associated with MRLs shown in FIGS. 3, 4 and 6 at time$_0$. Column 704 shows information encoded in a data zone of an MRL. The information encoded in the data zone of an MRL may not be changeable after the MRL is printed or otherwise affixed to a physical medium. Column 706 shows that the information encoded in the data zone includes a unique MRL identifier. The unique MRL identifier may be used to locate custom content associated with a MRL after a collectible MRL is activated and subsequently scanned by a viewer.

Column 708 shows a default scan destination associated with an MRL. The default scan destination may be extracted from a data zone of a scanned MRL by a scanning device and transmitted to a redirect service. The default scan destination may be transmitted to the redirect service each time a MRL is scanned. Upon receiving the default scan destination, the redirect service may determine whether the scanned MRL has been activated and associated with a custom scan destination.

Columns 710 and 716 show that all MRLs in table 701 are associated with the word "collectible" in the custom scan destination fields. Presence of the word collectible in these fields indicating that all the MRLs listed in table 701 are in a collectible state and are not associated with any custom content. Column 712 shows that none of the MRLs in table 701 have been assigned an owner. The null values in column 712 indicate that each of the MRLs in table 701 are ownerless.

In some embodiments, a collectible MRL may be associated with a first owner. The first owner may have created the collectible MRL and deployed the collectible MRL in an environment (e.g., printed stickers, posted in a train station, displayed on a billboard or on television). The collectible MRL created by the first owner may be collectible by a second owner. The second owner may collect the MRL subject to one or more restrictions imposed by the first owner. For example, the first owner may allow the second owner to associate any custom content with the MRL and require that scan event details and scan analytics associated with viewer scans of the MRL are accessible to the first owner.

Column 714 shows that an active time window may be entered when a corresponding MRL will be active and associated with the custom content destination stored in columns 710 and 716. Table 701 shows that all time windows are collectible or available to be assigned by an owner.

Column 718 shows that collectible MRLs may be associated with content restrictions. Content restrictions may limit an owner to associating custom content with an activated MRL that conforms to the restrictions associated with the MRL. For example, column 718 shows that the MRL 301 may only be linked to a target page on the www.flow.page domain.

FIG. 7B shows illustrative tabulated information 703 that may be utilized by a redirect service. Table 703 shows illustrative properties of MRLs shown in FIGS. 3, 4 and 6 at $time_1$. Row 705 shows that at $time_1$, MRL 301 (shown in FIG. 3) has been collected by John Doe. Row 705 also shows that John Doe has linked MRL 301 to custom scan location 1. When a viewer scans MRL 301 during the specified active time window, the view will be directed to www.flow.page/JohnDoe. Row 705 shows that content associated with MRL 301 conforms to the restrictions associated with MRL 301 (shown in column 718 of table 701).

Row 707 shows that at $time_1$, Station 313 Cafe has also collected MRL 301. Row 707 shows that Station 313 Cafe has linked MRL 301 to custom scan location 1 during a specified active time window that does not overlap with the active time window specified in row 705 and associated with John Doe. Custom content shown to a viewer that scans MRL 301 will depend on when the viewer scans MRL 301. Row 705 shows that content associated with MRL 301 in row 707 conforms to the restrictions associated with MRL 301 and shown in column 718 of table 701.

In some embodiments (not shown), machine learning techniques may detect that a viewer has collected MRL 301 and has not linked custom content to MRL 301. The machine learning techniques may automatically assign custom content to MRL 301 for an available active time window. In some embodiments (not shown), MRL 301 may remain collectible during the active time window shown in row 707.

Row 707 shows that MRL 301 is associated with two custom scan locations. Row 707 shows that MRL 301 is associated with a specific drinks menu (www.flow.page/Station313Cafe/Drinks_Menu) and more general information about Station 313 Cafe (www.flow.page/Station313Cafe). Machine learning techniques may determine which custom content associated with MRL 301 to present to which viewer. In some embodiments, a secondary custom content may be a backup. If the primary custom content is not available or is not loaded on a viewer device with a threshold time from when MRL 301 is scanned, the redirect service may push the secondary content to the viewer.

Row 709 shows that at $time_1$, MRL 303 remains collectible. Row 709 shows that at $time_1$, MRL 303 remains collectible only during a specified active time window. Row 711 shows that at $time_1$, MRL 303 has been collected by ABC Corp. for a specified active time window that does not overlap with the active time window of row 709.

In some embodiments, a MRL may be associated with two or more owners during overlapping active time windows. When two or more owners are associated with a MRL during an overlapping active time window, a redirect service and associated machine learning techniques may determine which owner's custom content is most relevant to a viewer that scans the MRL. "Relevancy" may be determined based on a CIG associated with a viewer or the scanned MRL. "Relevancy" may be determined based one or more scan event details. In some embodiments, the redirect service may randomize which custom content is presented to a scanning viewer.

Row 713 shows that at $time_1$, MRL 307 (shown in FIG. 3) has been collected by John Doe. Row 707 also shows that John Doe has linked MRL 301 to Custom Scan Location 1 anytime a viewer scans MRL 307.

Row 715 shows that at $time_1$, MRL 509 (shown in FIG. 5) is designated as having been assigned to by John Doe. A redirect service may detect that John Doe has collected MRL 307 and may assign ownership of MRL 509 to John Doe to increase likelihood of viewers accessing the custom content associated with MRL 307 (shown in row 705). Row 715 also shows that MRL 509 has been linked to a custom scan destination associated with John Doe anytime train 309 (shown in FIGS. 3 and 5) carrying MRL 307 is present in station 505 (shown in FIG. 5).

Row 717 shows that at $time_1$, MRL 509 (shown in FIG. 5) has been collected by Station 313 Cafe. Row 717 shows that MRL 509 is owned by Station 313 Cafe when train 309 is not in station 505. Row 717 also shows that custom content associated with MRL 509 includes a component [MEAL TIME] that is dynamically determined by a redirect service when MRL 509 is scanned. The redirect service may determine based on a scan time, an appropriate [MEAL TIME] menu to be displayed to the viewer that scans MRL 509. For example, if viewer scans MRL 509 between 11:30 am and 2:30 pm, the redirect service may present a lunch menu. If the viewer scans MRL 509 between 4 pm and 7 pm, the redirect service may present a dinner menu.

Row 717 also shows that MRL 509 is associated with two custom scan destinations. If a first custom scan destination is not available, the redirect service may attempt to present the alternative custom scan destination. In some embodiments, the redirect service may determine which of the two custom scan destinations are most relevant to a scanning viewer. "Relevancy" may be determined based on a CIG associated with a scanning viewer or a CIG associated with the scanned MRL. "Relevancy" may be determined based one or more scan event details. In some embodiments, the redirect service may randomize which custom content destination is presented to a scanning viewer.

Figure 8:
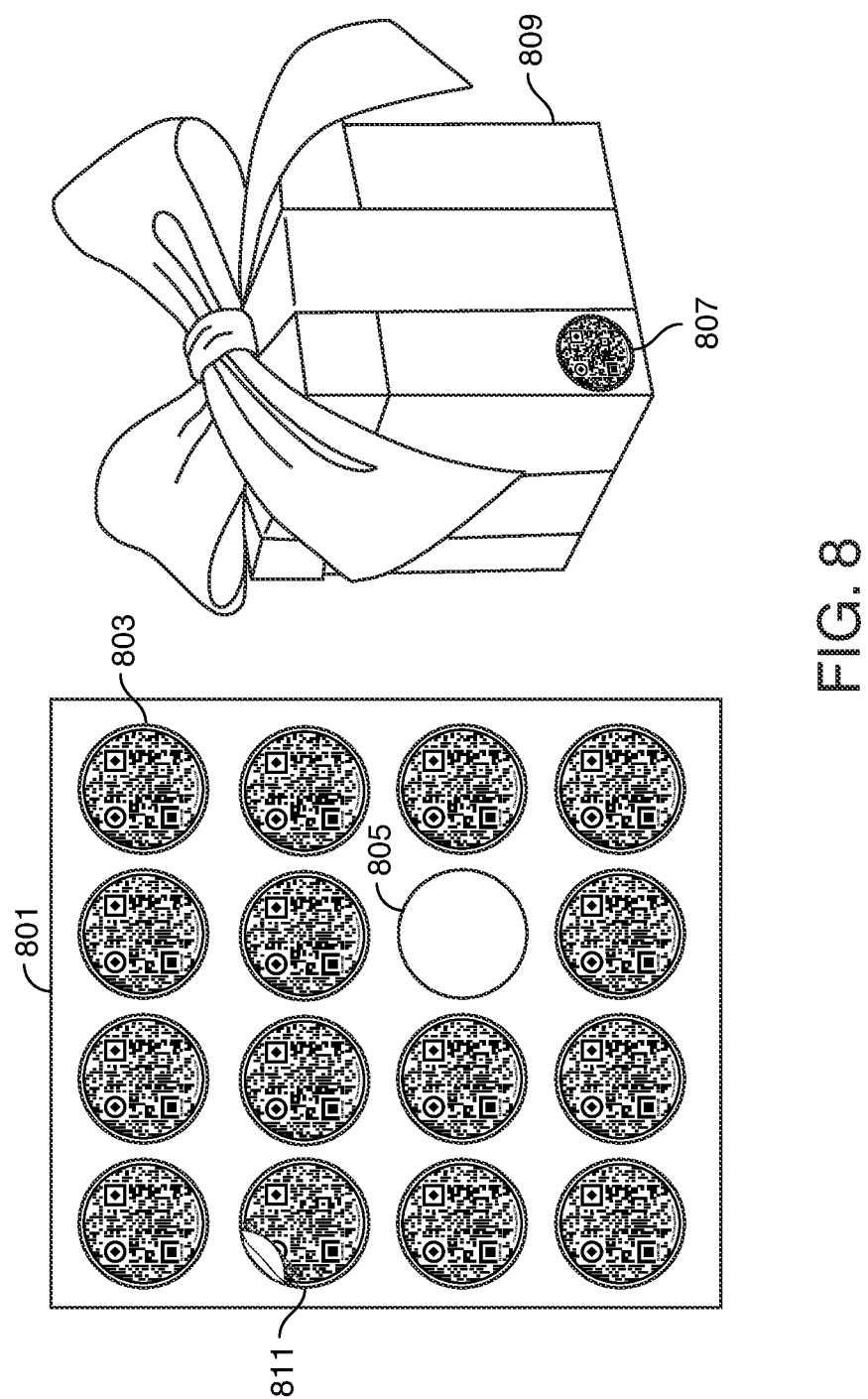
FIG. 8 shows an illustrative scenario in accordance with principles of the disclosure.

FIG. 8 shows an illustrative sheet 801 of collectible MRLs. Each of MRLs on sheet 801 may be printed on a sticker that may be peeled off sheet 801. For example, MRL 811 has been partially peeled off sheet 801. Each of MRLs may initially be printed on sheet 801 and distributed in a collectible state. An owner may associate one of MRLs on sheet 801 with custom content.

For example, an owner may associate MRL 807 with customized happy birthday wishes. MRL 807 may have been peeled off sheet 801 from location 805 and affixed to present 809. When a receiver of present 809 scans MRL 807, the receiver may be provided with access to the custom content associated with MRL 807.

The owner may associate MRL 807 with custom content that may only be viewable by a target mobile device. For example, the owner may configure MRL 807 such that custom content associated with MRL 807 is only viewable on a mobile device having a specified phone number. The owner may require a password (e.g., date of receiver's birthday) to access the custom content associated with MRL 807.

Figure 9:
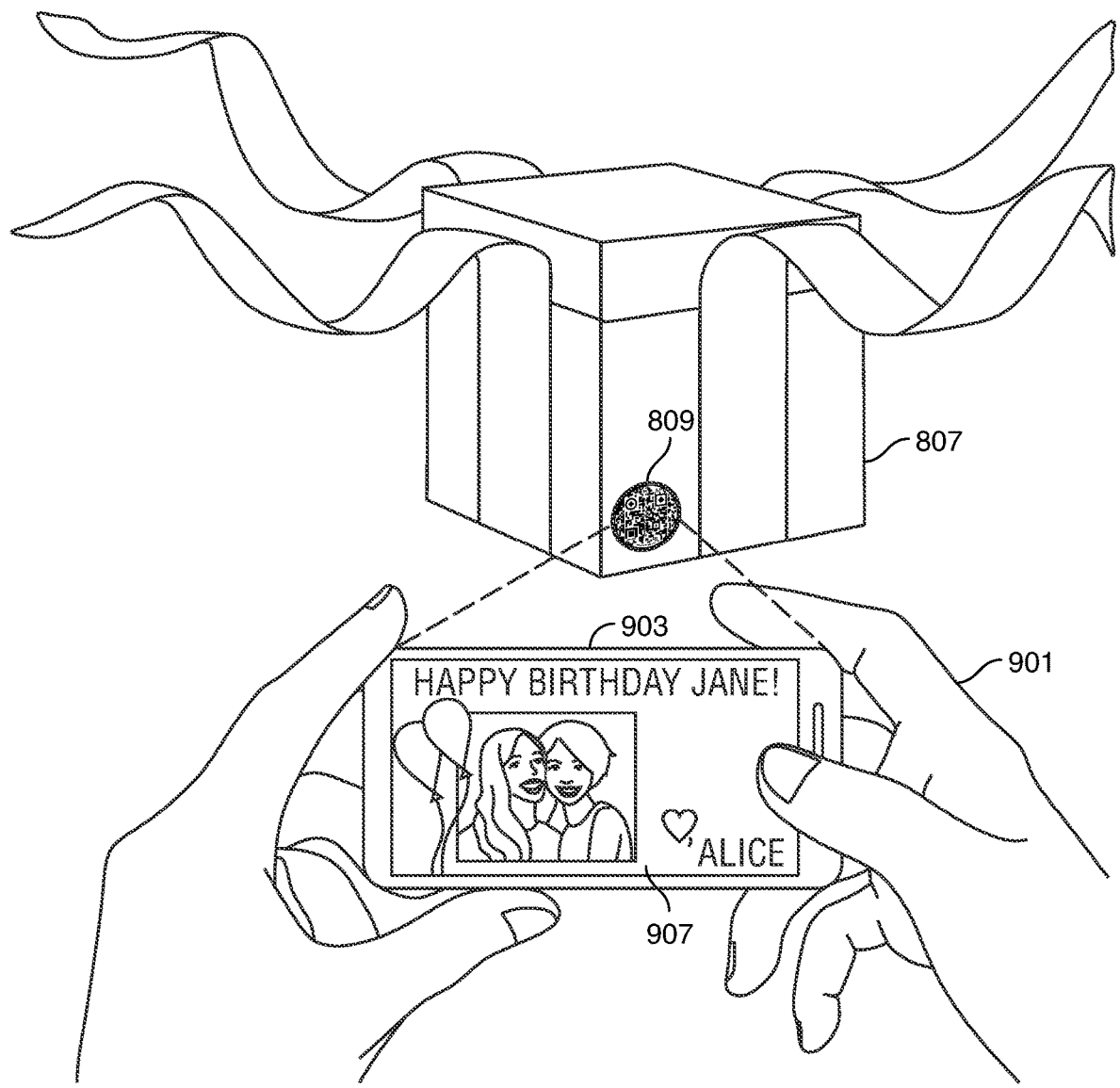
FIG. 9 shows an illustrative scenario in accordance with principles of the disclosure.

FIG. 9 shows that receiver 901 has opened present 809 and scanned MRL 807. In response to scanning MRL 807 using device 903, receiver 901 is presented with custom content 907. Custom content 907 includes a personalized message from the owner (e.g., sender of present 809).

Figure 10:
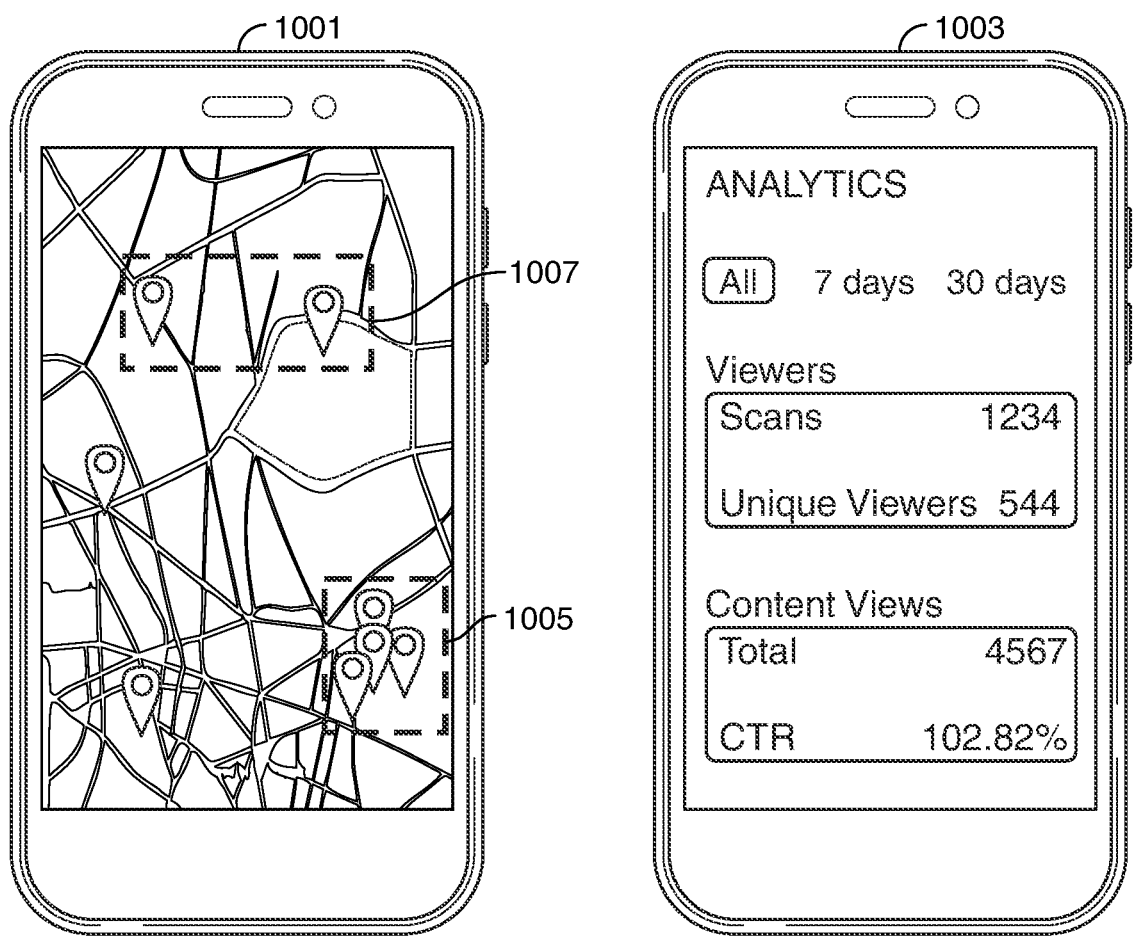
FIG. 10 shows illustrative information generated in accordance with principles of the disclosure.

FIG. 10 shows illustrative screenshots 1001 and 1003. Screenshots 1001 and 1003 may be generated within an application running on a mobile device. Screenshots 1001 and 1003 may be associated with a target MRL or group of MRLs. Screenshot 1001 shows that an owner may selectively activate MRLs within target geographic regions 1007 and/or 1005. An owner may view or search for collectible MRLs within a target geographic region. The owner may then selectively activate desired MRLs.

Viewer scans and associated scan event details of activated MRLs may be monitored. Screenshot 1003 shows illustrative performance metrics associated with activity of viewers who have scanned activated MRLs. Screenshot 1003 shows viewer scans and unique viewers that have scanned an MRL. Screenshot 1003 shows how many viewers have accessed custom content associated with a scanned MRL.

A redirect service may formulate target content that will be associated with a MRL based on performance metrics such as number of scans of the MRL or viewer engagement with content. For example, the redirect service may dynamically adjust content associated with an MRL in response to detecting poor (e.g., below a threshold level) engagement with content currently associated with the MRL. Engagement with content may include viewer interaction with a chatbot or add to cart or other activity/functionality available on presented content. A level of viewer engagement may be captured based on tracking code embedded in custom content.

Any suitable performance metrics associated with a scan of an MRL may be monitored. Other illustrative performance metrics that may be captured include an amount of time viewers spend viewing presented content, click-through-rate to other content linked within displayed content, performance of related MRLs (e.g., MRLs associated with same owner or same content), comparative performance metrics relative to other activated MRLs, heat maps showing viewer activity after scanning activated MRLs, and number of owners associated with an MRL.

Figure 11:
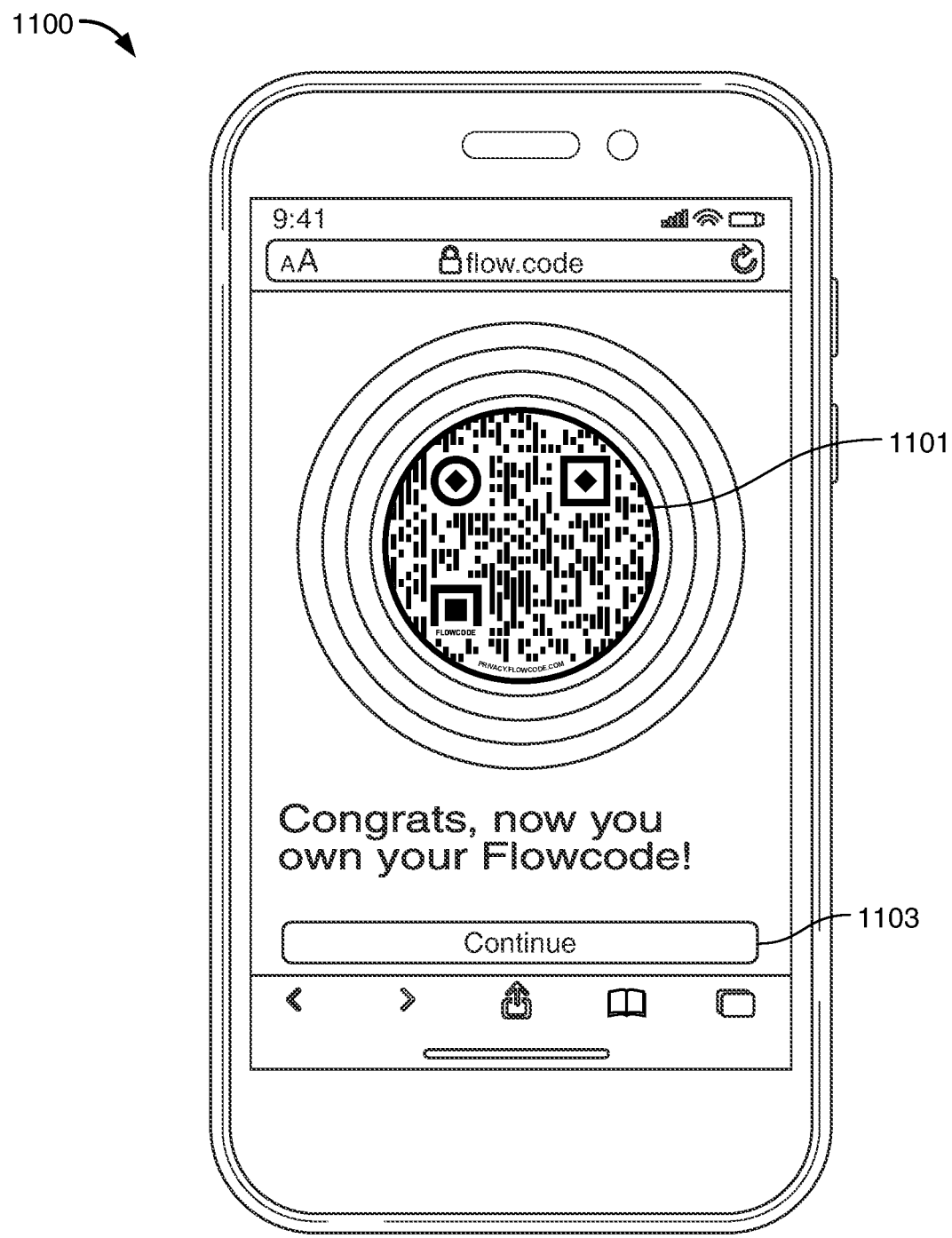
FIGS. 11-19 show screenshots of an illustrative workflow for creating and configuring an MRL.

FIG. 11 shows illustrative screenshot 1100. Screenshot 1100 may be presented within an illustrative workflow for creating and configuring collectible MRL 1101. Collectible MRL 1101 may be created using an MRL generator. Screenshot 1100 confirms the successful creation of MRL 1101. Screenshot 1100 shows that after MRL 1101 has been designed and generated, the owner/creator of MRL 1101 is prompted to activate button 1103 and associate custom content with MRL 1101. Button 1103 may be presented on a touch sensitive display. Button 1103 may be activated by touching the area of the screen bounded by button 1103.

Figure 12:
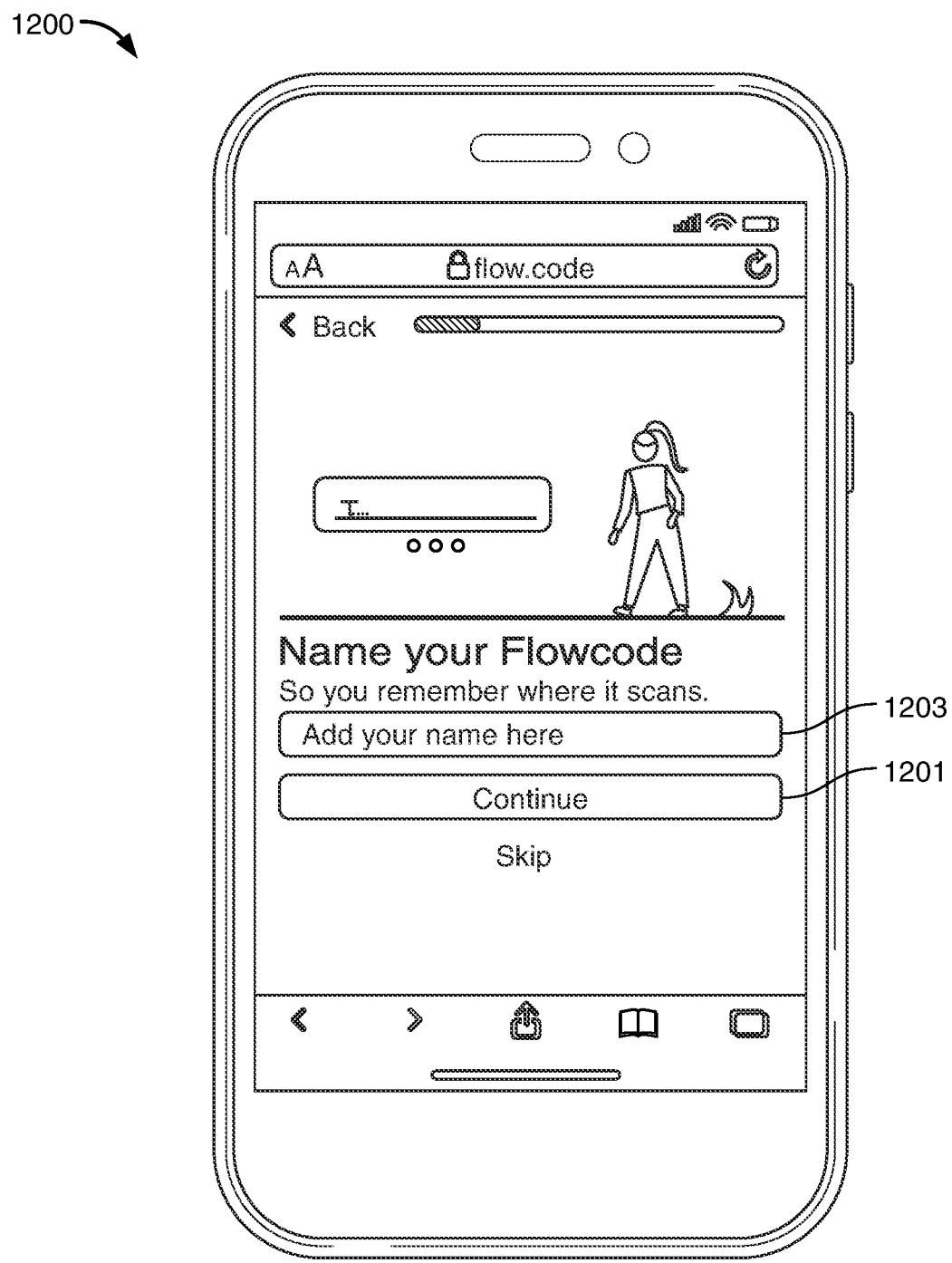

FIG. 12 shows illustrative screenshot 1200. Screenshot 1200 may be presented within an illustrative workflow for creating and configuring MRL 1101. Screenshot 1200 may be presented in response to owner/creator activating button 1103 (shown in FIG. 11). Screenshot 1200 prompts the owner/creator to use text box 1203 and assign a name to MRL 1101. Screenshot 1200 advises the owner/creator to use a name that is descriptive of custom content that will be associated with MRL 1101.

Figure 13:
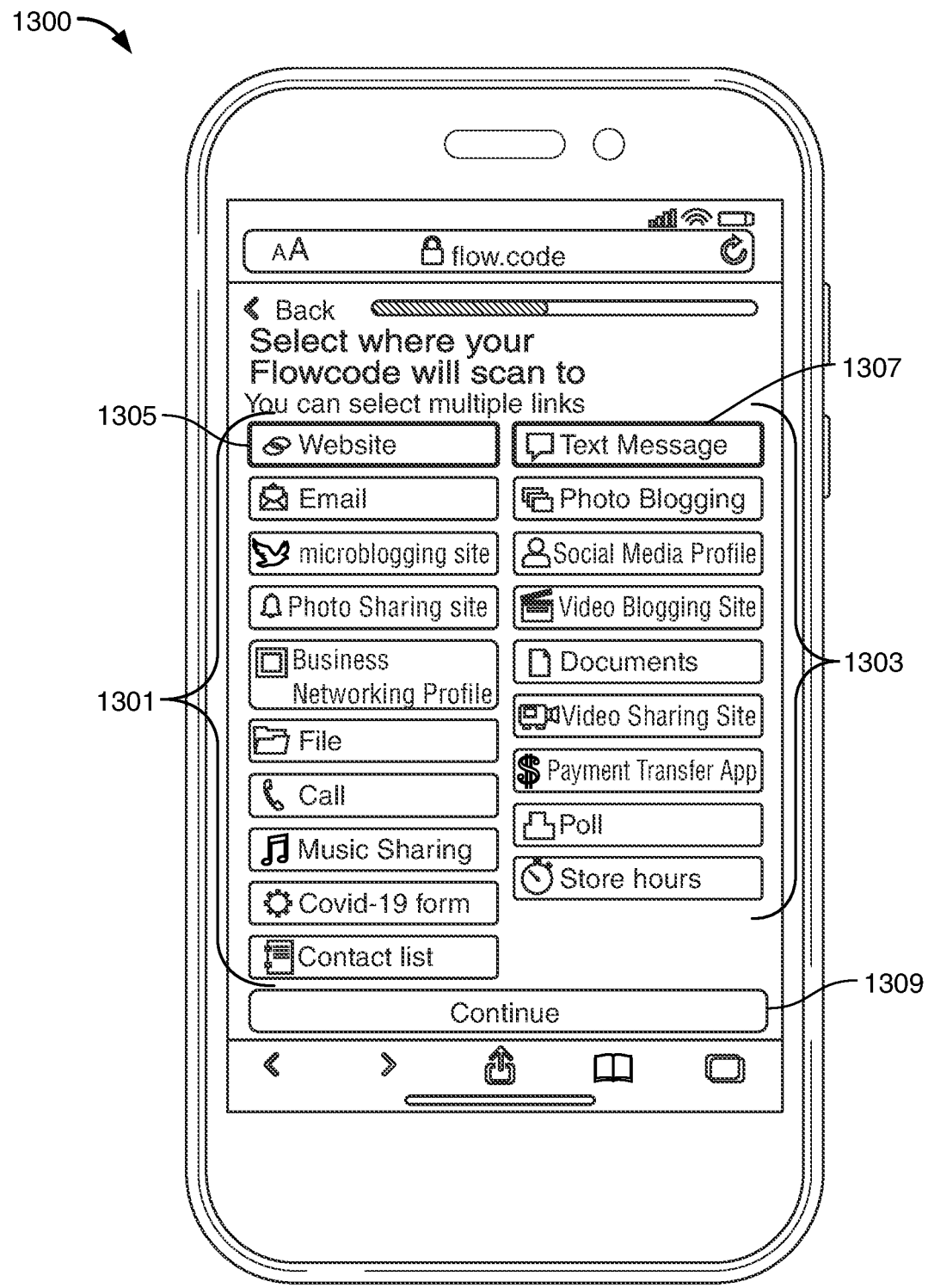

FIG. 13 shows illustrative screenshot 1300. Screenshot 1300 may be presented within an illustrative workflow for creating and configuring MRL 1101. Screenshot 1300 may be presented in response to owner/creator of MRL 1101 activating button 1201 (shown in FIG. 12). Screenshot 1300 presents illustrative custom content options 1301 and 1303 that may be linked to MRL 1101. After one or more of custom content options 1301 and 1303 are linked to MRL 1101, when a viewer scans MRL 1101, the linked custom content options may be presented on the viewer's scanning device. Screenshot 1300 shows that the owner/creator of MRL 1101 has linked custom content options 1305 and 1307 to MRL 1101.

Figure 14:
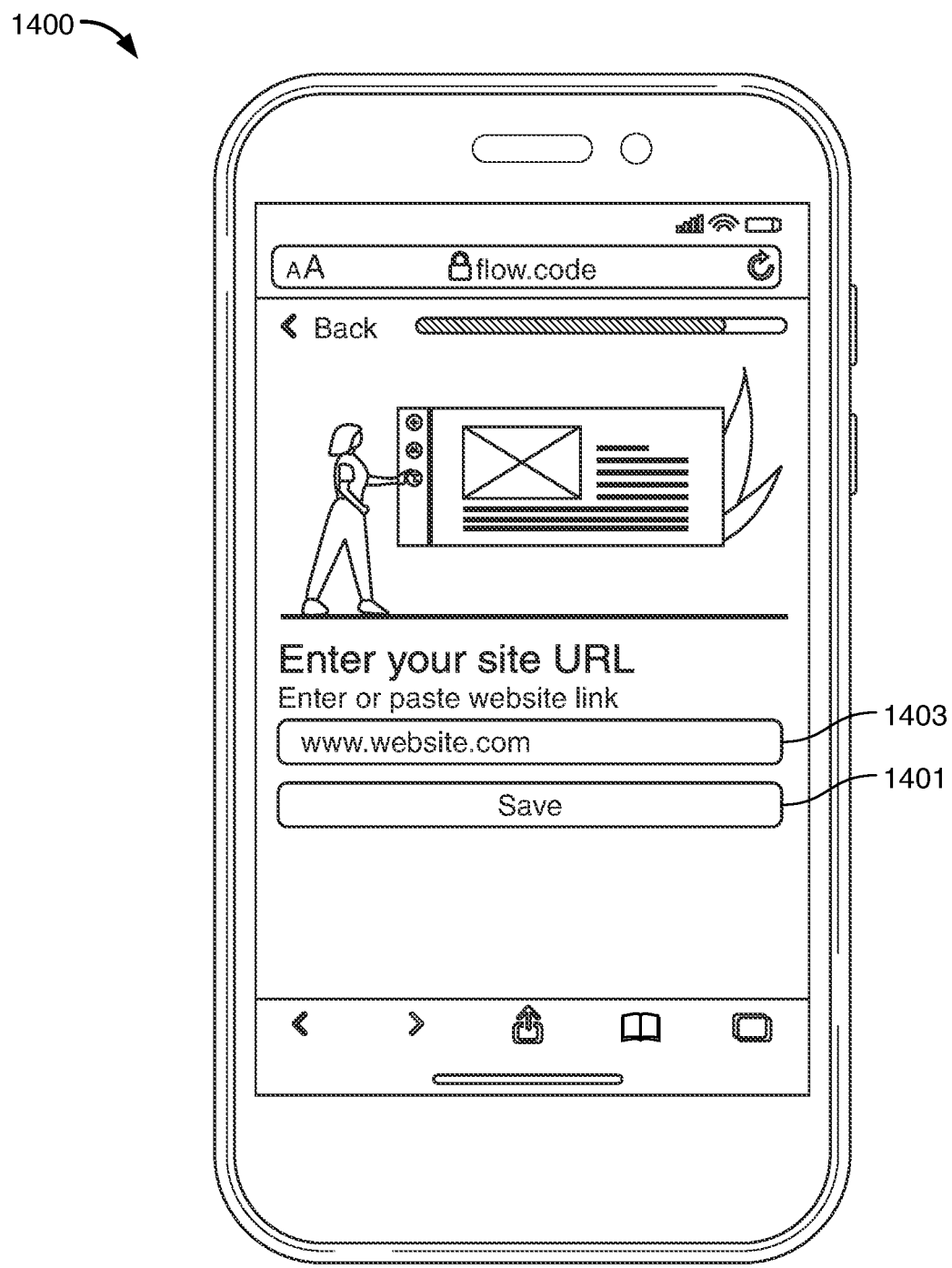

FIG. 14 shows illustrative screenshot 1400. Screenshot 1400 may be presented within an illustrative workflow for creating and configuring MRL 1101. Screenshot 1400 may be presented in response to owner/creator activating button 1309 (shown in FIG. 13). Screenshot 1400 may be added to the illustrative workflow for creating and configuring MRL 1101 in response to selection of custom content option 1305 (shown in FIG. 13). Screenshot 1400 prompts owner/creator of MRL 1101 to enter a website link using text box 1403. After activating button 1401, a viewer that scans MRL 1101 may be directed to the website link entered into text box 1403.

Figure 15:
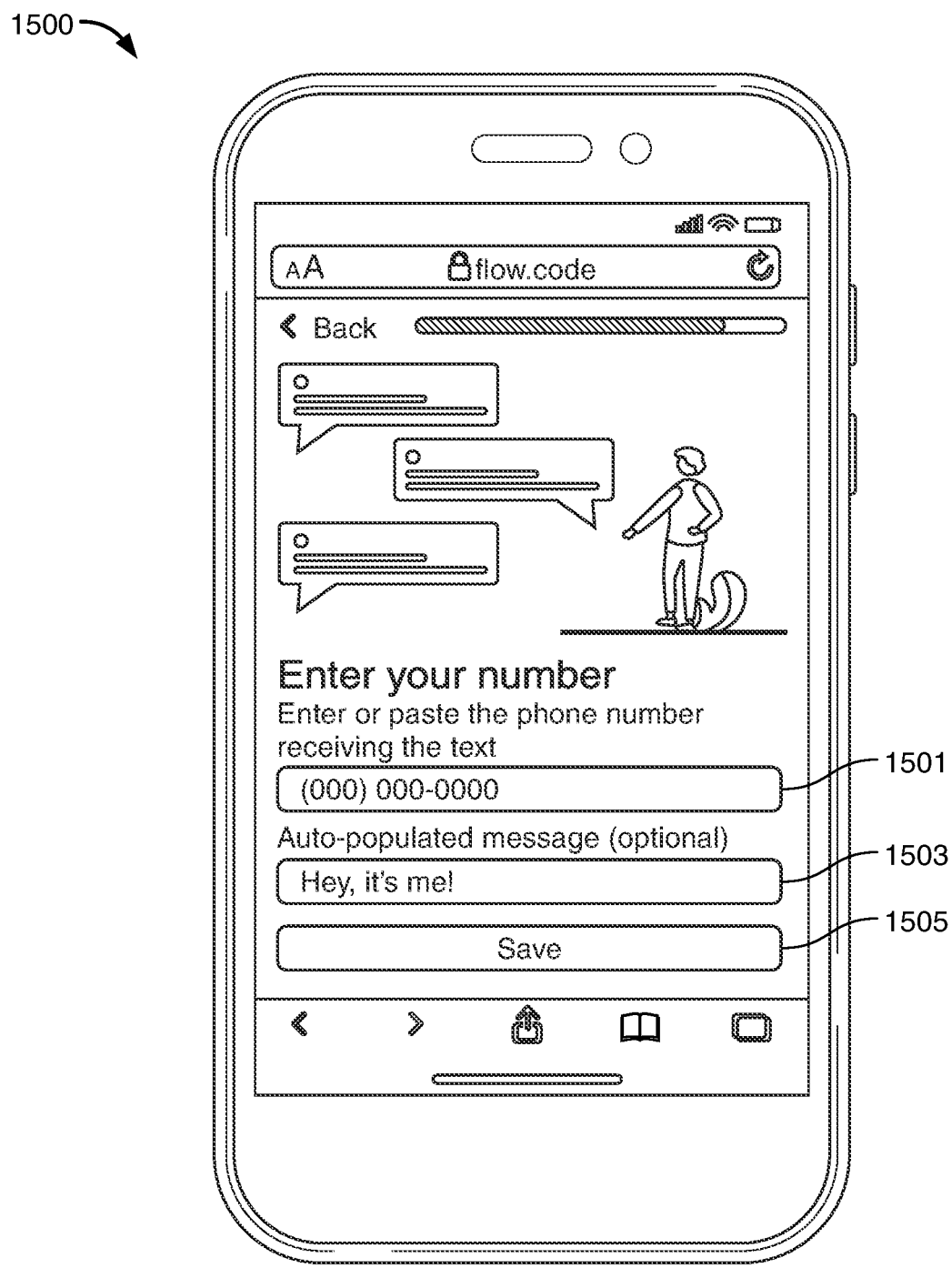

FIG. 15 shows illustrative screenshot 1500. Screenshot 1500 may be presented within an illustrative workflow for creating and configuring MRL 1101. Screenshot 1500 may be presented in response to owner/creator activating button 1401 (shown in FIG. 14). Screenshot 1500 may be added to the illustrative workflow in response to the selection of custom content option 1307 (shown in FIG. 13). Screenshot 1500 prompts an owner/creator to enter a destination number for a text message using text box 1501. Screenshot 1500 also includes a prompt for the owner/creator to enter an auto-populated text message that may be sent by a viewer that scans MRL 1101. After the owner/creator saves the destination number and message text using button 1505, a viewer that scans MRL 1101 may be prompted to send the message text (entered into text box 1503) to the destination number (entered into text box 1501).

Figure 16:
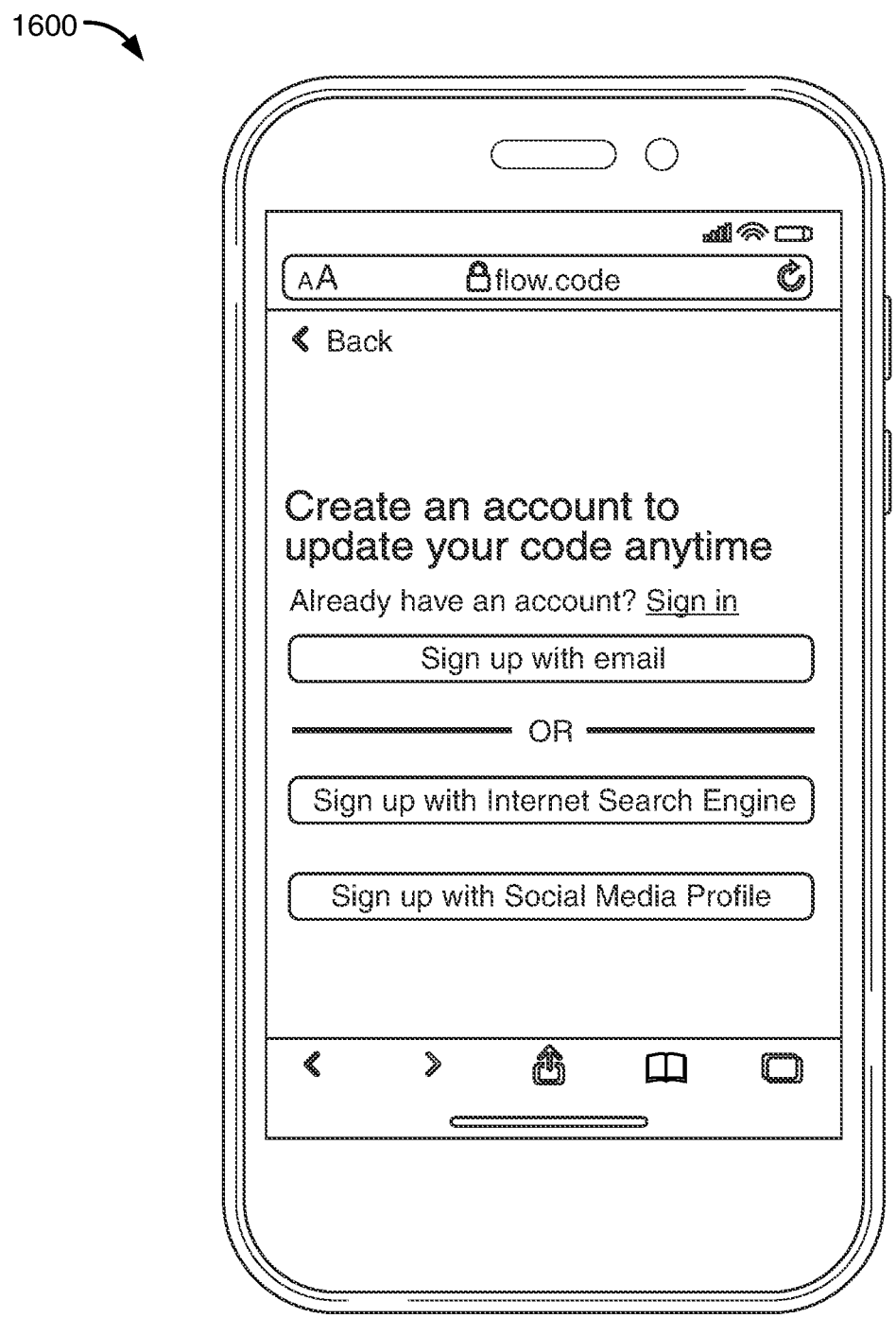

FIG. 16 shows illustrative screenshot 1600. Screenshot 1600 may be presented within an illustrative workflow for creating and configuring MRL 1101. After activating button 1505 and saving the destination number and message text associated with custom content option 1307, the owner/creator may be presented with screenshot 1600. Screenshot 1600 shows that the owner/creator is prompted to create an account. Creating an account may allow the owner/creator to save/update custom content options (e.g., 1301 or 1303) linked to MRL 1101, or any other settings associated with MRL 1101. Within an illustrative workflow for creating collectible MRL 1101, the owner/creator may only be prompted to create an account after generating MRL 1101. Positioning screenshot 1600 after generating MRL 1101 may increase the likelihood that the owner/creator of MRL 1101 will create an account.

In some embodiments, the owner/creator may order printed copies of MRL 1101 without creating an account. In some embodiments, the owner/creator may design an MRL, order printed copies of the MRL and only after receiving the printed copies, link the MRL to custom content. In such embodiments, the owner/creator may scan a printed copy of the MRL to trigger a workflow for associating custom content with the MRL. In some embodiments, an illustrative workflow may allow an owner/creator to associate one or more custom content options with a MRL even without creating an account. In other embodiments, the owner/creator may be required to create an account before associating one or more custom content options with an MRL.

Figure 17:
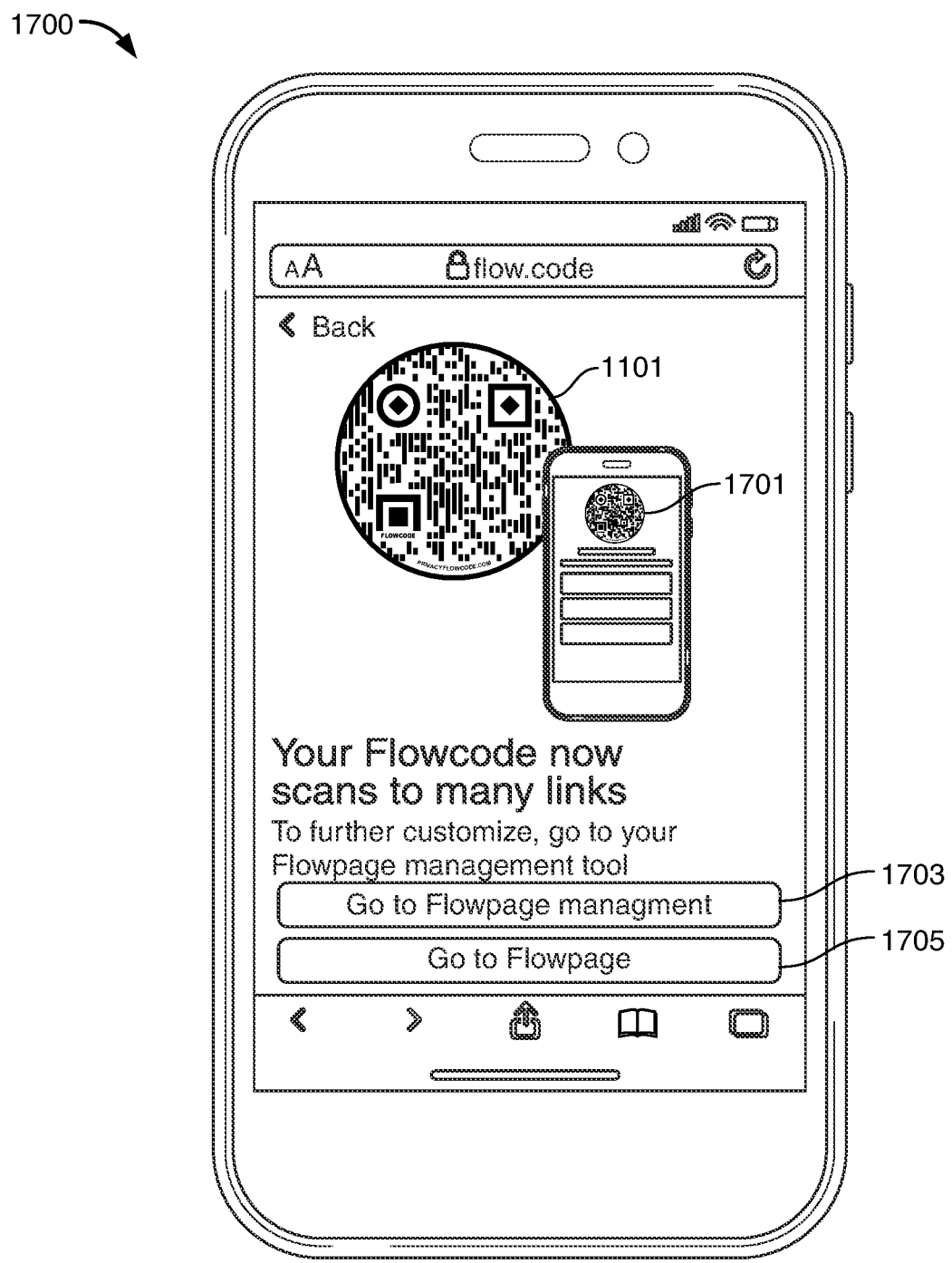

FIG. 17 shows illustrative screenshot 1700. Screenshot 1700 may be presented within an illustrative workflow for creating and configuring MRL 1101. Screenshot 1700 shows illustrative information that may be displayed when an owner/creator logs into a created account. Screenshot 1700 shows that the owner/creator may be shown MRL 1101. Screenshot 1700 shows that the owner/creator may be shown illustrative landing page 1701 that will be displayed to a viewer that scans MRL 1101. Screenshot 1700 shows that the owner/creator may activate button 1703 to access additional tools for customizing layout and content of landing page 1701. Screenshot 1700 shows that the owner/creator may activate button 1705 to view landing page 1701 that will be displayed in response to a scan of MRL 1101.

Figure 18:
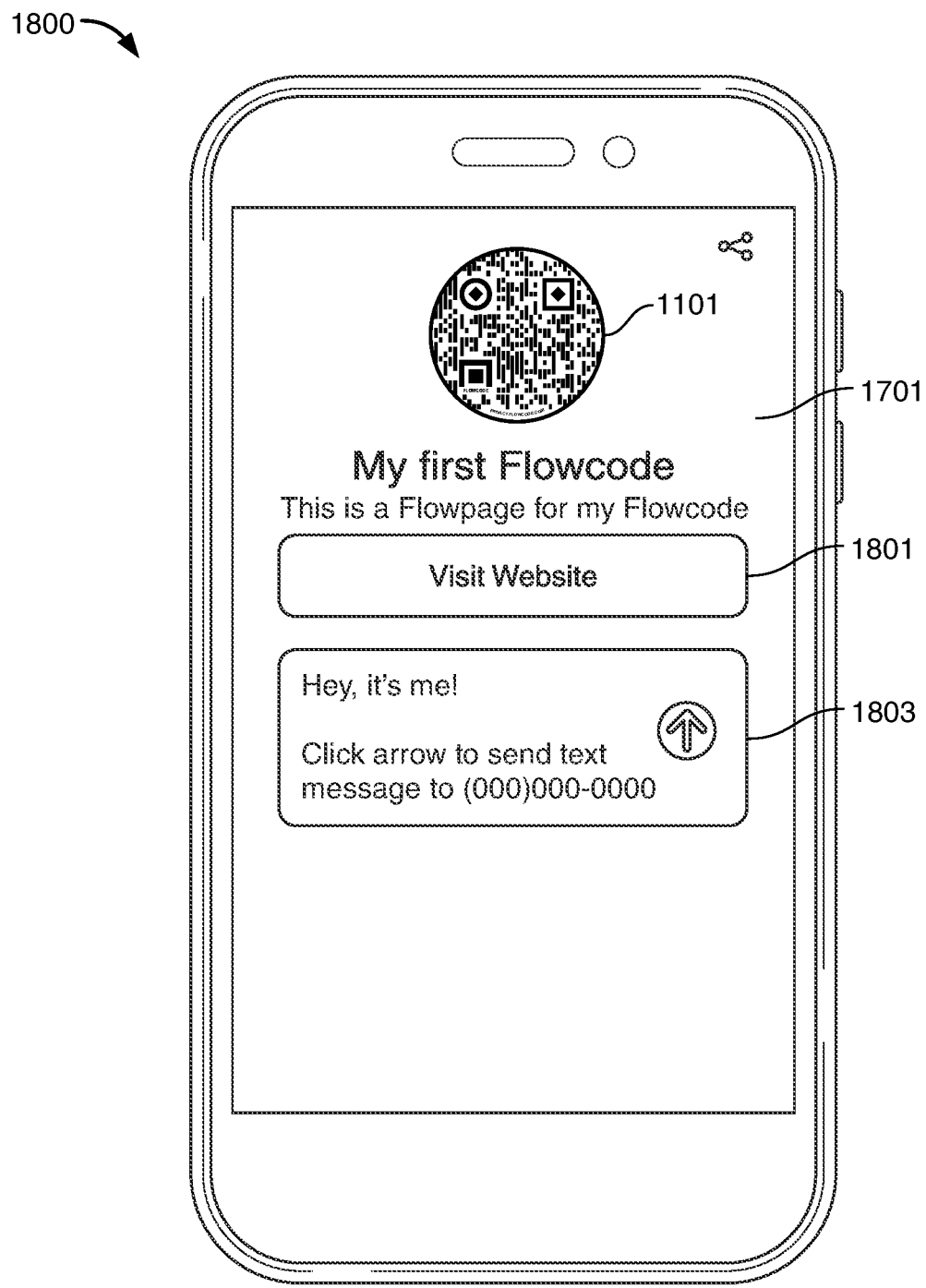

FIG. 18 shows illustrative screenshot 1800. Screenshot 1800 may be presented within an illustrative workflow for creating and configuring MRL 1101. Screenshot 1800 shows landing page 1701. Landing page 1701 includes a display of MRL 1101. Scanning MRL 1101 will trigger display of landing page 1701. Landing page 1701 includes button 1801 to access the website linked to MRL 1101 (as shown in FIG. 14). Landing page 1701 includes button 1803 for sending the text message linked to MRL 1101 (as shown in FIG. 15).

Figure 19:
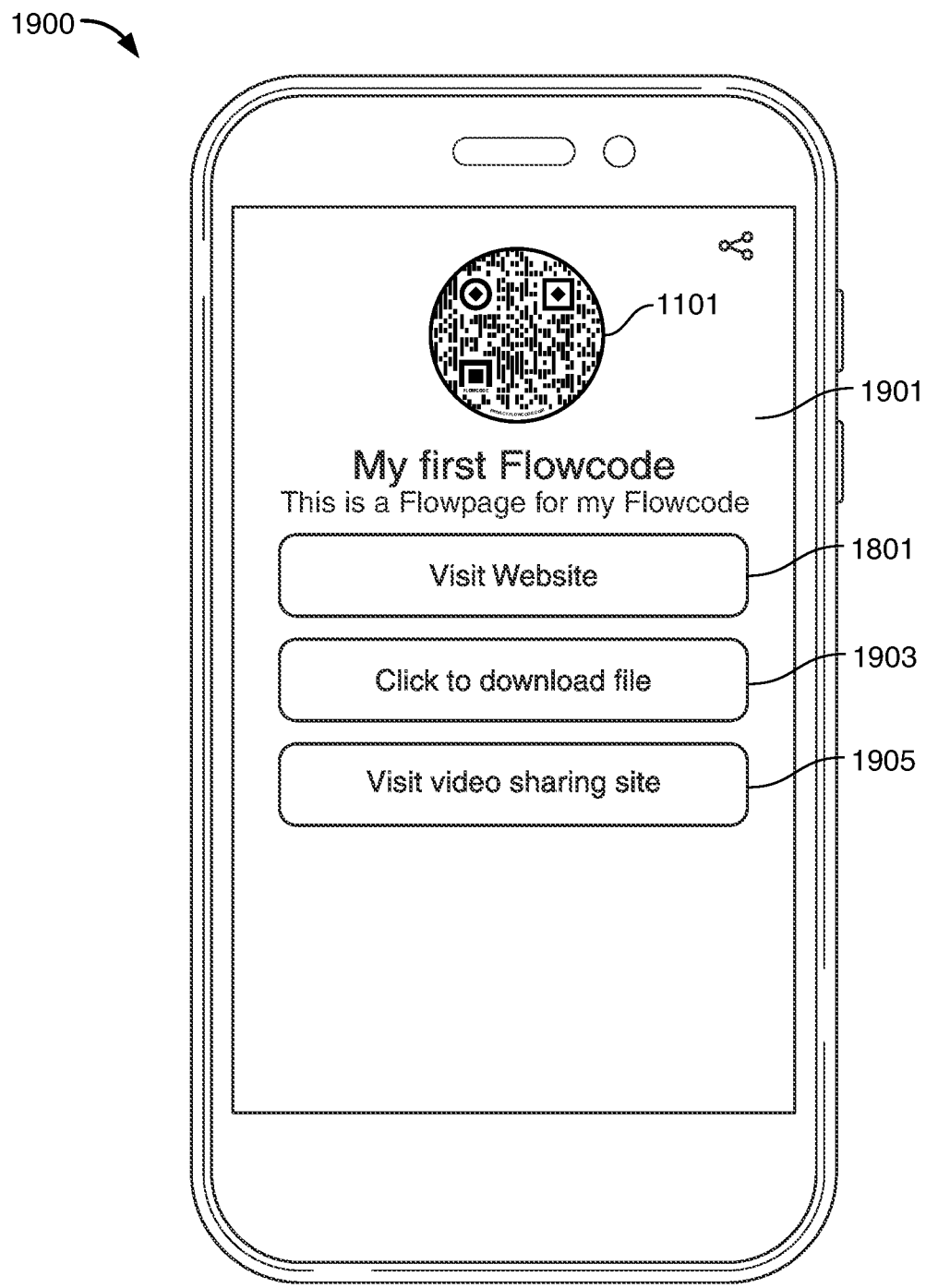

FIG. 19 shows illustrative screenshot 1900. Screenshot 1900 may be presented within an illustrative workflow for creating and configuring MRL 1101. Screenshot 1900 shows illustrative landing page 1901. An owner/creator of MRL 1101 may login to a created account and adjust custom content options linked to MRL 1101. Landing page 1901 shows that MRL 1101 may be associated with downloadable file 1903 and video sharing site 1905. Landing page 1901 also shows that MRL 1101 has been disassociated with the text message 1803 shown in landing page 1701 (see FIG. 18). An owner/creator may associate MRL 1101 with any suitable combination of custom content options, including one more of custom content options shown 1301 and 1303 (shown in FIG. 13).

Thus, methods and apparatus for COLLECTIBLE MACHINE-READABLE CODES are provided. Persons skilled in the art will appreciate that the present disclosure can be practiced by other than the described embodiments, which are presented for purposes of illustration rather than of limitation, and that the present disclosure is limited only by the claims that follow.

What is claimed is:

1. A method for creating a digital touch point on a tangible, offline surface, the method comprising:
    generating a static machine-readable label ("SMRL") that encodes a default scan destination in a data zone of the SMRL;
    affixing the SMRL to the tangible, offline surface;
    receiving a first request for access to the default scan destination;
    detecting that the default scan destination is not linked to a custom scan destination;
    prompting for the custom scan destination in response to the first request;
    receiving the custom scan destination;
    linking the default scan destination to the custom scan destination; and
    in response to receiving a second request for access to the default scan destination, providing access to the custom scan destination.

2. The method of claim 1, wherein the first request for access to the default scan destination is received from a device that scanned the SMRL and extracted the default scan destination from the data zone of the SMRL.

3. The method of claim 2 wherein affixing the SMRL to the tangible, offline surface prevents alteration of the data zone.

4. The method of claim 1 wherein:
    the data zone encodes a web address that is uniquely associated with the SMRL;
    a default scan destination corresponds to a truncated segment of the web address; and
    the custom scan destination is indexed based on the web address that is uniquely associated with the SMRL.

5. The method of claim 1 wherein the SMRL is one of a plurality of SMRLs and linking the default scan destination of the SMRL to the custom scan destination triggers linking of the custom scan destination to the default scan destination of each of the plurality of SMRLs.

6. The method of claim 1, further comprising:
    storing an activation time the default scan destination is linked to the custom scan destination; and
    after expiration of predetermined duration after the activation time, disassociating the custom scan destination from the default scan destination.

7. The method of claim 1, the prompting for the custom scan destination in response to the first request comprises providing software tools for generating content displayed at the custom scan destination.

8. The method of claim 1, wherein:
    the first request for access to the default scan destination is generated by a first device that captures a first scan of the SMRL; and
    the second request for the access to the default scan destination is generated by a second device that captures a second scan of the SMRL.

9. The method of claim 1 further comprising applying machine learning techniques that dynamically alters the custom scan destination.

10. The method of claim 9, wherein, the machine learning techniques dynamically alters the custom scan destination based on a number of times the SMRL is scanned.

11. The method of claim 10, wherein the machine learning techniques dynamically alter the custom scan destination for a target user based on a number of times the SMRL is scanned by the target user.

12. A system for creating a digital touch point on a tangible, offline surface, the system comprising:
    a static machine-readable label ("SMRL") that encodes a default content destination in a data zone of the SMRL;
    a scanning device that extracts the default content destination from the SMRL and formulates a first request for access to the default content destination; and
    a redirect service that:
        receives the first request from the scanning device;
        in response to receiving the first request, prompts the scanning device to associate custom content with the SMRL;
        receives the custom content from the scanning device;
        links the custom content to the SMRL; and
        provides the custom content in response to receiving a second request for access to the default content destination.

13. The system of claim 12, wherein the second request is received from a second scanning device and the redirect service formats the custom content for display on the second scanning device.

14. The system of claim 12, wherein the second request is received from a second scanning device and the redirect service formats the custom content for display on the second scanning device based on one or more scan event details captured by the second scanning device.

15. The system of claim 12, wherein the SMRL is a first SMRL, the default content destination is a first default content destination, the scanning device is a first scanning device and the redirect service:
   receives a third request from the first scanning device for access to a second default content destination extracted from a second SMRL;
   in response to receiving the third request, links the custom content associated with the first SMRL to the second SMRL; and
   provides the custom content to a second scanning device in response to receiving a fourth request for access to the second default content destination received from the second scanning device.

16. The system of claim 12, further comprising a SMRL generator that generates a copy of the SMRL that is optimized for scanning the data zone when the SMRL is electronically displayed on a screen.

17. The system of claim 12 wherein the SMRL is one of a plurality of SMRLs and after the SMRL is linked to the custom content, the redirect service locates at least one other SMRL included in the plurality and links the at least one other SMRL to the custom content.

18. The system of claim 17, wherein each of the plurality of SMRLs is positioned within a geographic region.

19. The system of claim 12 wherein the custom content is first custom content and the redirect service:
   provides the first custom content in response to requests for access to the default content destination received during a first time period; and
   provides second custom content in response to requests for access to the default content destination received during a second time period.

20. The system of claim 12 wherein:
   the custom content is first custom content;
   the redirect service provides the first custom content in response to a first scan of the SMRL captured in a first geographic location; and
   the redirect service provides second custom content in response to a second scan of the SMRL captured in a second geographic location.

* * * * *